(12) United States Patent
Gaskamp et al.

(10) Patent No.: US 9,668,467 B2
(45) Date of Patent: **\*Jun. 6, 2017**

(54) SYSTEMS AND METHODS FOR TRAPPING ANIMALS

(71) Applicant: The Samuel Roberts Noble Foundation, Inc., Ardmore, OK (US)

(72) Inventors: Joshua Gaskamp, Marietta, OK (US); Kenneth L. Gee, Ardmore, OK (US); Steven P. Rhines, Ardmore, OK (US)

(73) Assignee: The Samuel Roberts Noble Foundation, Inc., Ardmore, OK (US)

( \* ) Notice: Subject to any disclaimer, the term of this patent is extended or adjusted under 35 U.S.C. 154(b) by 0 days.

This patent is subject to a terminal disclaimer.

(21) Appl. No.: 14/927,251

(22) Filed: Oct. 29, 2015

(65) Prior Publication Data

US 2016/0050903 A1 Feb. 25, 2016

Related U.S. Application Data

(63) Continuation of application No. 14/256,614, filed on Apr. 18, 2014, now Pat. No. 9,237,743.

(51) Int. Cl.
| | |
|---|---|
| *A01M 23/00* | (2006.01) |
| *A01M 23/22* | (2006.01) |
| *A01M 23/20* | (2006.01) |
| *A01M 31/00* | (2006.01) |
| *G05B 19/19* | (2006.01) |
| *G06K 9/00* | (2006.01) |
| *H04N 5/232* | (2006.01) |

(52) U.S. Cl.
CPC ............ *A01M 23/20* (2013.01); *A01M 23/00* (2013.01); *A01M 23/22* (2013.01); *A01M 31/002* (2013.01); *G05B 19/19* (2013.01); *G06K 9/00362* (2013.01); *H04N 5/232* (2013.01); *A01M 2200/00* (2013.01); *G05B 2219/45113* (2013.01)

(58) Field of Classification Search
CPC ...... A01M 23/18; A01M 23/20; A01M 23/00; A01M 23/16; A01M 23/22
USPC .......................................... 43/58, 60, 61, 62
See application file for complete search history.

(56) References Cited

U.S. PATENT DOCUMENTS 79,686 A \* 7/1868 Rain ..................... A01M 23/22
43/62
99,537 A 2/1870 Cole
(Continued)

FOREIGN PATENT DOCUMENTS

| FR | 2663194 | 12/1991 |
| WO | WO 2012/155200 | 11/2012 |

OTHER PUBLICATIONS

USPTO: Non-Final Office Action regarding U.S. Appl. No. 13/396,452, dated Sep. 9, 2015.
(Continued)

*Primary Examiner* — Marc Burgess
(74) *Attorney, Agent, or Firm* — Dentons US LLP

(57) ABSTRACT

A system and methods for trapping animals including an enclosure adapted to be suspended above a trap area. The enclosure may be movable from the suspended position to a lowered position to enclose a trap area. The system further includes a user-directed control system to remotely control the position of the enclosure in order to trap animals within the enclosure.

13 Claims, 17 Drawing Sheets

(56) References Cited

U.S. PATENT DOCUMENTS

| | | | |
|---|---|---|---|
| 778,675 A | 12/1904 | Kerns | |
| 874,654 A | 12/1907 | Beaudry | |
| 1,088,477 A | 2/1914 | de St. Legeir | |
| 1,648,160 A * | 11/1927 | Boedecker | A01M 23/22 43/62 |
| 2,412,518 A | 12/1946 | Krelwitz | |
| 2,707,844 A | 5/1955 | Ciolli | |
| 3,008,261 A | 11/1961 | Long | |
| 4,567,688 A | 2/1986 | McKee | |
| 5,024,021 A | 6/1991 | Wang | |
| 5,819,124 A | 10/1998 | Somner et al. | |
| 5,825,431 A | 10/1998 | Walker | |
| 5,845,432 A * | 12/1998 | Tully | A01M 23/20 43/61 |
| 5,864,982 A | 2/1999 | Tully et al. | |
| 5,878,283 A | 3/1999 | House et al. | |
| 6,069,655 A | 5/2000 | Seeley et al. | |
| 6,385,772 B1 | 5/2002 | Courtney | |
| 6,438,893 B1 | 8/2002 | DeCorby | |
| 6,449,431 B1 | 9/2002 | Cuddeback et al. | |
| 6,456,320 B2 | 9/2002 | Kuwano et al. | |
| 6,484,436 B1 | 11/2002 | Chang | |
| 6,539,663 B2 | 4/2003 | Mosher | |
| 6,658,788 B1 | 12/2003 | Steinfest | |
| 6,678,413 B1 | 1/2004 | Liang et al. | |
| 6,732,471 B2 | 5/2004 | Draper | |
| 6,735,387 B1 | 5/2004 | Schnell | |
| 6,768,868 B1 | 7/2004 | Schnell | |
| 6,775,946 B2 | 8/2004 | Wright | |
| 6,834,162 B1 | 12/2004 | Schnell | |
| 6,930,709 B1 | 8/2005 | Creamer et al. | |
| 7,023,469 B1 | 4/2006 | Olson | |
| 7,051,472 B1 | 5/2006 | Kelly | |
| 7,149,422 B2 | 12/2006 | Schnell | |
| 7,246,196 B2 | 7/2007 | Fukami et al. | |
| 7,301,456 B2 | 11/2007 | Han | |
| 7,308,196 B2 | 12/2007 | Schnell | |
| 7,310,111 B2 | 12/2007 | Ramirez-Diaz et al. | |
| 7,339,607 B2 | 3/2008 | Damabhorn | |
| 7,398,617 B2 | 7/2008 | Mattox | |
| 7,425,987 B2 | 9/2008 | Creamer et al. | |
| 7,428,005 B2 | 9/2008 | Creamer et al. | |
| 7,463,145 B2 | 12/2008 | Jentoft | |
| 7,465,108 B2 | 12/2008 | Brown | |
| 7,465,145 B2 | 12/2008 | Kane | |
| 7,471,334 B1 | 12/2008 | Stenger | |
| 7,486,183 B2 | 2/2009 | Luebke et al. | |
| 7,523,480 B2 | 4/2009 | Creamer et al. | |
| 7,534,056 B2 | 5/2009 | Cross et al. | |
| 7,593,632 B2 | 9/2009 | Schnell | |
| 7,643,056 B2 | 1/2010 | Silsby | |
| RE41,103 E | 2/2010 | Barraclough et al. | |
| 7,657,914 B2 | 2/2010 | Whelan et al. | |
| 7,697,927 B1 | 4/2010 | Owens | |
| 7,702,135 B2 | 4/2010 | Hill et al. | |
| 7,710,457 B2 | 5/2010 | Schnell | |
| 7,817,914 B2 | 10/2010 | Kuberka et al. | |
| D628,224 S | 11/2010 | Barley et al. | |
| D628,614 S | 12/2010 | Barley et al. | |
| 7,854,088 B2 | 12/2010 | Kurachi | |
| 7,861,676 B2 | 1/2011 | Kates | |
| 7,873,266 B2 | 1/2011 | Schnell et al. | |
| 7,930,853 B2 | 4/2011 | Pomerantz | |
| 8,010,631 B2 | 8/2011 | Brailean et al. | |
| 8,022,367 B2 | 9/2011 | Finch et al. | |
| 8,061,076 B2 | 11/2011 | Kelly | |
| 8,081,073 B2 | 12/2011 | Reibel et al. | |
| 8,096,078 B2 | 1/2012 | Watson | |
| 8,112,934 B2 | 2/2012 | Alter et al. | |
| 8,155,105 B2 | 4/2012 | Reibel et al. | |
| 8,254,776 B2 | 8/2012 | Schnell | |
| 8,350,915 B2 | 1/2013 | Schnell | |
| 8,359,783 B1 | 1/2013 | Kamery et al. | |
| 8,397,426 B2 | 3/2013 | Rodgers et al. | |
| 8,407,930 B2 | 4/2013 | DeKalb | |
| 8,413,368 B2 | 4/2013 | DeKalb | |
| 8,416,299 B2 | 4/2013 | Moore | |
| 8,418,396 B2 | 4/2013 | Moustirats | |
| 8,421,861 B2 | 4/2013 | Barley et al. | |
| 8,451,333 B2 | 5/2013 | Sandler et al. | |
| 8,480,316 B2 | 7/2013 | Smith | |
| 8,493,454 B1 | 7/2013 | Kohn et al. | |
| 9,237,743 B2 * | 1/2016 | Gaskamp | A01M 23/22 |
| 2002/0011019 A1 | 1/2002 | Stoico et al. | |
| 2003/0014902 A1 * | 1/2003 | Draper | A01M 23/32 43/62 |
| 2003/0213161 A1 | 11/2003 | Gardner et al. | |
| 2004/0057567 A1 | 3/2004 | Lee | |
| 2004/0233282 A1 | 11/2004 | Stavely et al. | |
| 2004/0233284 A1 | 11/2004 | Lesesky et al. | |
| 2005/0104958 A1 | 5/2005 | Egnal et al. | |
| 2005/0280704 A1 | 12/2005 | Clare et al. | |
| 2005/0285941 A1 | 12/2005 | Haigh et al. | |
| 2006/0042153 A1 | 3/2006 | Bowerman | |
| 2006/0069463 A1 | 3/2006 | Kim | |
| 2006/0152594 A1 | 7/2006 | Landschaft et al. | |
| 2007/0028279 A1 | 2/2007 | Kim | |
| 2007/0036535 A1 | 2/2007 | Chee | |
| 2007/0131005 A1 | 6/2007 | Clare | |
| 2007/0248219 A1 | 10/2007 | Foster et al. | |
| 2007/0252693 A1 | 11/2007 | Janson | |
| 2008/0084787 A1 | 4/2008 | Graber | |
| 2008/0122929 A1 | 5/2008 | Chukwu | |
| 2008/0134564 A1 | 6/2008 | Tseng | |
| 2008/0151050 A1 | 6/2008 | Self | |
| 2008/0151056 A1 | 6/2008 | Ahamefula | |
| 2008/0158358 A1 | 7/2008 | Chanson et al. | |
| 2008/0231714 A1 | 9/2008 | Estevez et al. | |
| 2008/0236023 A1 | 10/2008 | Thomas et al. | |
| 2008/0259161 A1 | 10/2008 | Hellman et al. | |
| 2009/0051484 A1 | 2/2009 | Foster et al. | |
| 2009/0094882 A1 | 4/2009 | Comstock | |
| 2009/0151221 A1 | 6/2009 | Daley | |
| 2009/0237509 A1 | 9/2009 | Saxon | |
| 2010/0154287 A1 | 6/2010 | Irons | |
| 2011/0025846 A1 | 2/2011 | Garrett | |
| 2011/0088625 A1 | 4/2011 | Nowacek | |
| 2011/0102588 A1 | 5/2011 | Trundle et al. | |
| 2011/0167709 A1 | 7/2011 | Pinkston | |
| 2011/0308137 A1 | 12/2011 | Ugiansky | |
| 2012/0086547 A1 | 4/2012 | Foster et al. | |
| 2012/0113253 A1 | 5/2012 | Slater | |
| 2012/0188345 A1 | 7/2012 | Salow | |
| 2012/0212582 A1 | 8/2012 | Deutsch | |
| 2012/0327225 A1 | 12/2012 | Barley et al. | |
| 2012/0327242 A1 | 12/2012 | Barley et al. | |
| 2013/0010109 A1 | 1/2013 | Chen et al. | |
| 2013/0031824 A1 | 2/2013 | Arlichson | |
| 2013/0081322 A1 | 4/2013 | Alfarhan | |
| 2013/0081323 A1 | 4/2013 | Alfarhan | |
| 2013/0124847 A1 | 5/2013 | Fried et al. | |
| 2013/0167428 A1 | 7/2013 | Alhuwaishel | |
| 2013/0174469 A1 | 7/2013 | Kittelson | |
| 2013/0188047 A1 | 7/2013 | Slevin et al. | |
| 2013/0205645 A1 | 8/2013 | Gaskamp et al. | |
| 2013/0215266 A1 | 8/2013 | Trundle et al. | |
| 2013/0222581 A1 | 8/2013 | Wydner et al. | |
| 2013/0229515 A1 | 9/2013 | Barley et al. | |
| 2013/0236049 A1 | 9/2013 | Jung et al. | |
| 2013/0245881 A1 | 9/2013 | Scarbrough | |
| 2013/0265440 A1 | 10/2013 | Mizuta | |
| 2016/0277688 A1 | 9/2016 | Gaskamp et al. | |

OTHER PUBLICATIONS

Response to Non-Final Office Action regarding U.S. Appl. No. 13/396,452, dated Nov. 9, 2015.
U.S. Appl. No. 14/256,614, filed Apr. 18, 2015, Gaskamp et al.
Stevens, "The feral hog in Oklahoma," Second Edition, The Samuel Roberts Noble Foundation, Agricultural Division, 2010.
Gee et al., "The Noble Foundation drop-net system for capturing white-tailed deer—the next generation," Abstracts of the 22nd Annual Southeast Deer Study Group, 1999.

(56) References Cited

OTHER PUBLICATIONS

USPTO: Non-Final Office Action regarding U.S. Appl. No. 13/396,452, dated Aug. 19, 2014.
Response to Non-Final Office Action regarding U.S. Appl. No. 13/396,452, dated Jan. 7, 2015.
USPTO: Final Office Action regarding U.S. Appl. No. 13/396,452, dated Feb. 5, 2015.
Response to Final Office Action regarding U.S. Appl. No. 13/396,452, dated May 1, 2015.
Cabela's, image of "Cabela's Outfitter Series Trail Cameras," from Cabela's catalogue, image creation date Feb. 10, 2014.
Cabela's, "Cabela's Outfitter Series Trail Cameras," available at <http://www.cabelas.com/category/Cabelas-Outfitter-Series-Trail-Cameras/328647780.uts>, accessed Jun. 29, 2015.
trailcampro.com, "2013 Trail Camera Detection Zone Test," available at <http://www.trailcampro.com/detectionzonetest.aspx>, accessed Jun. 29, 2015.
Response to Final Office Action regarding U.S. Appl. No. 13/396,452, dated Jun. 29, 2016.
USPTO: Final Office Action regarding U.S. Appl. No. 13/396,452, dated Feb. 2, 2016.
USPTO: Advisory Action regarding U.S. Appl. No. 13/396,452, dated Jul. 12, 2016.
Non-Final Office Action regarding U.S. Appl. No. 13/396,452, dated Aug. 23, 2016.
Response to Non-Final Office Action regarding U.S. Appl. No. 13/396,452, dated Feb. 16, 2017.

\* cited by examiner

SYSTEMS AND METHODS FOR TRAPPING ANIMALS

CROSS-REFERENCE TO RELATED APPLICATIONS

This application is a continuation of co-pending U.S. patent application Ser. No. 14/256,614, filed Apr. 18, 2014, the disclosure of which is incorporated herein by reference in its entirety.

FIELD OF THE INVENTION

The present disclosure relates generally to systems and methods for trapping wild animals. More specifically, systems and methods are provided for trapping animals by moving a suspended enclosure to a lowered position to enclose a trap area. In some embodiments, the position of the enclosure is controlled remotely.

BACKGROUND

Overpopulation of wild animals, such as wild or feral hogs, can be problematic in a number of ways. Feral hogs may damage trees, vegetation, agricultural interests, and other property. The extent of property damage associated with feral hogs has been estimated to be as high as $800 million annually in the United States alone. In addition, feral hogs may prey on domestic animals such as pets and livestock, and may injure other animal populations by hunting them, destroying their habitat, and spreading disease.

The size and number of feral hogs in the United States contributes to their ability to cause damage to property and other animal populations. Mature feral hogs in the United States may be as tall as 36 inches and weigh from 100 to 400 lbs. Feral hog populations are also staggering. A publication by the Samuel Roberts Noble Foundation of Ardmore, Okla. estimated there were between 617,000 and 1.4 million feral hogs in Oklahoma in 2007, and the Texas Parks and Wildlife Department estimates that there are more than 1.5 million feral hogs in Texas, citing the animals' limited number of natural predators and high reproductive potential as underlying factors in the large population. Sows can produce up to ten piglets per litter and may produce two litters per year. Piglets reach sexual maturity at six months of age, allowing the hog population to quickly reach a state of overpopulation.

Because feral hogs are so numerous and have virtually no natural predators, in some areas it is desirable to artificially control their populations by trapping them. However, feral hogs are difficult to trap because they are relatively intelligent, have keen senses of hearing and smell, and quickly become suspicious of traps. In addition to being difficult to trap, the hogs' bulk and strength may render many traps unsuitable for capturing and holding multiple hogs.

A number of feral hog or animal traps and trapping systems exist today. Many trap designs are intended to trap one or only a small number of animals, commonly, animal-actuated traps. These traps are largely ineffective in controlling or impacting exploding feral animal populations. A smaller number of trap designs provide for a large corral-like structure to be constructed with the intention of capturing larger numbers of feral animals; however, these traps require considerable space, time and effort to construct and deconstruct. And, while such structures may be assembled on site, they are not readily portable. Given the fixed nature of these corral-systems (which include fixed panels that extend up from the ground), these systems typically require many days of visiting the site, baiting and training animals to overcome their suspicion. Lastly, there are a very small number of suspended trap systems that include animal-actuated systems (which have limited effectiveness) and/or require heavy-duty lift systems that require impractical or costly structures or complex cabling/pulleys as well as considerable applications of force to effect the raising and maintenance of a suspended trap above a trap site.

In addition to feral hogs, it may be desirable to trap a variety of other animals (e.g. burros, bears, and deer) and birds (e.g. geese) for purposes of urban encroachment, relocation, research or eradication.

SUMMARY OF THE INVENTION

In one aspect, the invention provides a system for trapping animals comprising a first enclosure adapted to be suspended above a trap area and is movable from a raised position to a lowered position. The system may further comprise a second enclosure having a plurality of vertical support members arranged about a centerline, wherein the first enclosure and the second enclosure are concentrically arranged relative to the centerline, and the first enclosure is configured to slideably engage the second enclosure to enable the first enclosure to rotate about the centerline to effect movement to and from the lowered position. The system may further comprise a pivotable member having a first engagement portion, a second engagement portion and a pivot support located therebetween, wherein the second engagement portion is configured to releasably engage the first enclosure when the first enclosure is in the raised position. The system may further comprise an actuator, selectable between at least an engaged position and a disengaged position, to releasably engage the pivotable member, wherein in the engaged position, the actuator engages and retains the first engagement portion of the pivotable member, and in the disengaged position, the actuator releases the first engagement portion of the pivotable member and allows the pivotable member to rotate about the pivot support. In some embodiments, when the actuator is in the engaged position, the actuator engages the pivotable member and the pivotable member engages the first enclosure, the actuator in the disengaged position effects the release of the pivotable member from the actuator, the pivotable member pivots about the pivot point and releases the first enclosure to allow the first enclosure to rotate from the raised position to the lowered position and enclose the trap area.

In certain embodiments, the first enclosure of the system comprises one or more wire panels. In further embodiments, the second enclosure comprises one or more wire panels. The system may further comprise a cross-brace coupled between at least two support members. In certain embodiments, the system comprises a lifting mechanism coupled to the second enclosure, configured to be attachable to the first enclosure, wherein when attached to the first enclosure, the lifting mechanism effects a rotation of the first enclosure relative to the second enclosure to raise the first enclosure into the raised position. In some embodiments, the system further comprises a camera to allow a user to view the trap area from a remote location or a control system, operably coupled to the actuator, to allow the user to select between the engaged position and the disengaged position from the remote location thereby dropping the first enclosure. The system may further comprise a motion detector to detect motion at the trap area; and a controller, coupled to the motion director and camera, to activate the camera upon detected motion by the motion detector and to notify the user through the control system.

In another aspect, the invention provides a system for trapping animals comprising a support structure; an enclosure rotationally coupled to the support structure to allow the enclosure to rotate relative to the support structure to move between a suspended position and a lowered position; and a release mechanism operably coupled to the enclosure and configured to hold the enclosure in the suspended position when the release mechanism is engaged and to release the enclosure to rotate relative to the support structure to transition to the lowered position when the release mechanism is released.

In yet another aspect, the invention provides a system for trapping animals comprising a support structure; an enclosure rotationally coupled to the support structure to allow the enclosure to rotate about the support structure to move between a suspended position and a lowered position; a release mechanism operably coupled to the enclosure and configured to hold the enclosure in the suspended position when the release mechanism is engaged and to release the enclosure to the lowered position when the release mechanism is released; and a control system, operably coupled to the release mechanism, to allow a user to release the release mechanism thereby allowing the enclosure to rotate relative to the support structure to drop the enclosure to the lowered position.

In some embodiments, the enclosure of the system comprises one or more wire panel sections. The support structure may comprise one or more wire panel sections. In other embodiments, the system further comprises a camera to allow a user to remotely view a trap area beneath the enclosure when the enclosure is in the suspended position. In further embodiments, the support structure includes at least one support member; and the enclosure includes at least one spiral guide that slideably engages the at least one support member to enable rotation relative to the support structure.

In certain embodiments, the system further comprises an actuator having an engaged position and a disengaged position, and the release mechanism comprises a pivotable member having a first portion that releasably engages the actuator and a second portion that releasably engages the enclosure, the pivotable member further being configured to rotate about a pivot support between an coupled position and a released position, wherein in the engaged position, the second portion of the pivotable member releasably engages and maintains the enclosure in the suspended position, and in the disengaged position, the second portion of the pivotable member in the released position releases the enclosure to rotate from the suspended position to the lowered position.

In yet further embodiments, the actuator in the engaged position releasably engages the first portion of the pivotable member in the coupled position, and the actuator in the disengaged position releases the first portion of the pivotable member to allow the pivotable member to rotate into the released position. In some embodiments, the actuator is operably coupled to the control system, which controls whether the actuator is in the engaged position or the disengaged position; and the control system further comprises a communications system, to communicate with the user at remote locations, and a controller, coupled to and controlling at least the communications system and the actuator. The control system may further comprise a camera to allow the user from a remote location to view at least a trap area beneath the enclosure in the suspended position. In other embodiments, the control system further comprises a motion detector to detect motion at the trap area; and a controller, coupled to the motion director and camera, to activate the camera upon detected motion by the motion detector and to notify the user through the control system. The control system may further comprise a communications system, coupled to the controller, to communicate with the user at the remote location.

Other features and advantages of the illustrative embodiments will become apparent with reference to the drawings and detailed description that follow.

DETAILED DESCRIPTION

Figure 1:
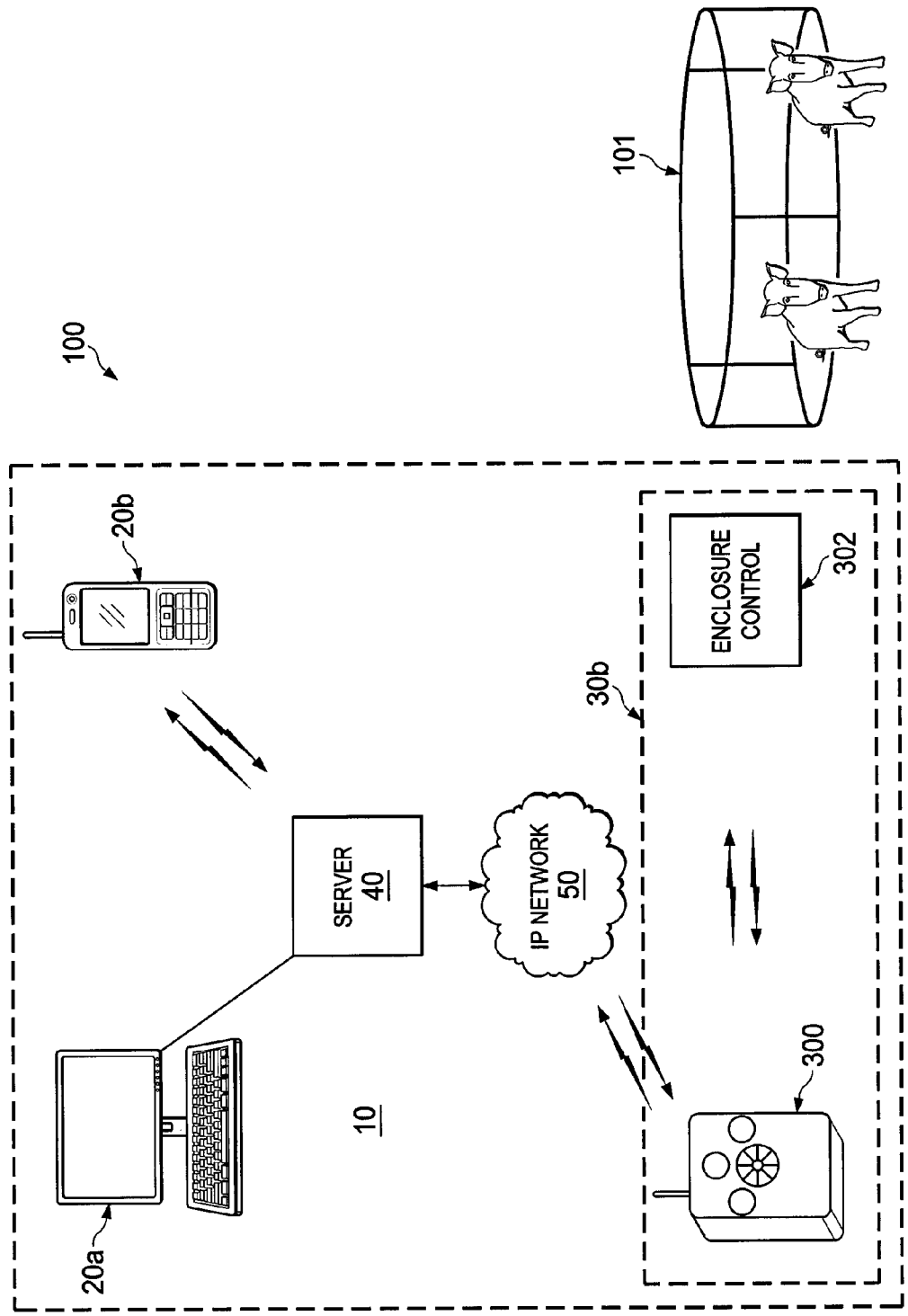
FIG. 1 is a schematic diagram of one embodiment of a system for remotely viewing a trap area and effecting the actuation of an animal trap that falls and encompasses such trap area to contain one or more trapped animals.

In the following detailed description of the illustrative, non-limiting embodiments, reference is made to the accompanying drawings that form a part hereof. These illustrative embodiments are described in sufficient detail to enable those skilled in the art to practice the invention. It is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is not to be taken in a limiting sense, and the scope of the illustrative embodiments is defined only by the appended claims.

It will be understood that the benefits and advantages described above may relate to one embodiment or may relate to several embodiments. It will further be understood that reference to "an" item may refer to one or more of those items.

Feral hogs or other wild animals may quickly learn to recognize and avoid traps. Typically, the hogs may recognize traps by observing structural elements of the trap, such as panels, posts, or gates that are at or near the animals' eye level. The innate suspiciousness of feral hogs, for example, makes it difficult to capture an entire group of hogs, i.e. a sounder of hogs, which in turn makes it difficult to make any meaningful reduction in their population. Further, feral hogs are often large and powerful animals that are capable of destroying or escaping from some traps. There is a need for a trap that does not trigger the suspicions of the hogs, yet is large enough and robust enough to catch and hold large numbers of hogs.

This specification relates to apparatus and methods that may be adapted, in some embodiments, to provide a system for trapping animals. In certain embodiments, the disclosed system and apparatus includes an enclosure adapted to be suspended above a trap area. The system includes a fixed enclosure and a concentrically arranged, movable enclosure capable of rotational movement relative to the fixed enclosure. A release mechanism includes a pivotable member, and the pivotable member is configured to rotate about a pivot support between an engaged position and a released position. The pivotable member in the engaged position supports the movable enclosure to hold the movable enclosure in a suspended position, and the pivotable member in the released position releases the moveable enclosure to allow the enclosure to rotate about the fixed enclosure and transition from the suspended position to a lowered position and enclose the trap area. The system further includes an actuator, which in an engaged position holds the pivotable member, and in a disengaged position the actuator releases the pivotable member to allow the pivotable member to rotate into the released position. The system further includes a user-directed control system to remotely control the position of the actuator from the engaged position to the disengaged position.

Referring to FIG. 1, a remotely controlled trap system 100 is provided that uses a suspended enclosure 101 that is operatively suspended above the line-of-sight of an animal to be trapped, for example a feral hog, to avoid triggering the animal's suspicion. The trap system 100 includes a robust, rigid enclosure 101 that can be raised to a suspended position over a trap area and supported by one or more support members. To prepare the trap system 100, a user places bait within the trap area. To ready the trap system 100, the user raises the enclosure 101 to a suspended position and releasably couples the movable enclosure 101 to a release mechanism. The release mechanism holds the movable enclosure 101 in the suspended position until the user provides an actuation signal, thereby dropping the enclosure 101.

The user may monitor and actuate the trap system using a control system 10. The control system 10 includes two primary components: a user device 20 and an on-site system 30. The user device 20 and on-site system 30 communicate through a conventional server 40 and IP network 50. The server 40 enables the storage and management of data transferred through the control and operation of the trap system 100.

The user device 20 may be a computer 20a, a cellular device 20b (e.g. smart phone), or other electronic communications device. The on-site system 30 comprises a camera, a communication system, and a controller for actuating the trap system 100. The control system 10 allows the user to monitor the trap area from a remote location where the user may wait until a desired number of animals have entered the trap area and, when ready, to effect the actuation of the enclosure 101.

When the user determines that the desired number of animals have entered the trap area, the user communicates a drop signal via the user device 20 to the on-site system 30. The on-site system 30 actuates the release mechanism in response to receiving the drop signal, causing the release mechanism to release the enclosure 101. The released enclosure 101 quickly drops to the ground, trapping the animals. This may be viewed, for example in real time, through the operation of the control system 10. The enclosure 101 has a robust construction to resist the animals' attempts to escape until the user returns to remove the animals in a controlled manner.

Referring now to the illustrative embodiments of FIGS. 2-7, a trap system 100a includes an enclosure 101a that is slideably engaged to a plurality of support members 102, which includes a base support 104. The enclosure 101a is releasably coupled to a release mechanism 116a that is coupled to the base support 104 and controlled using an on-site system 30.

Figure 2:
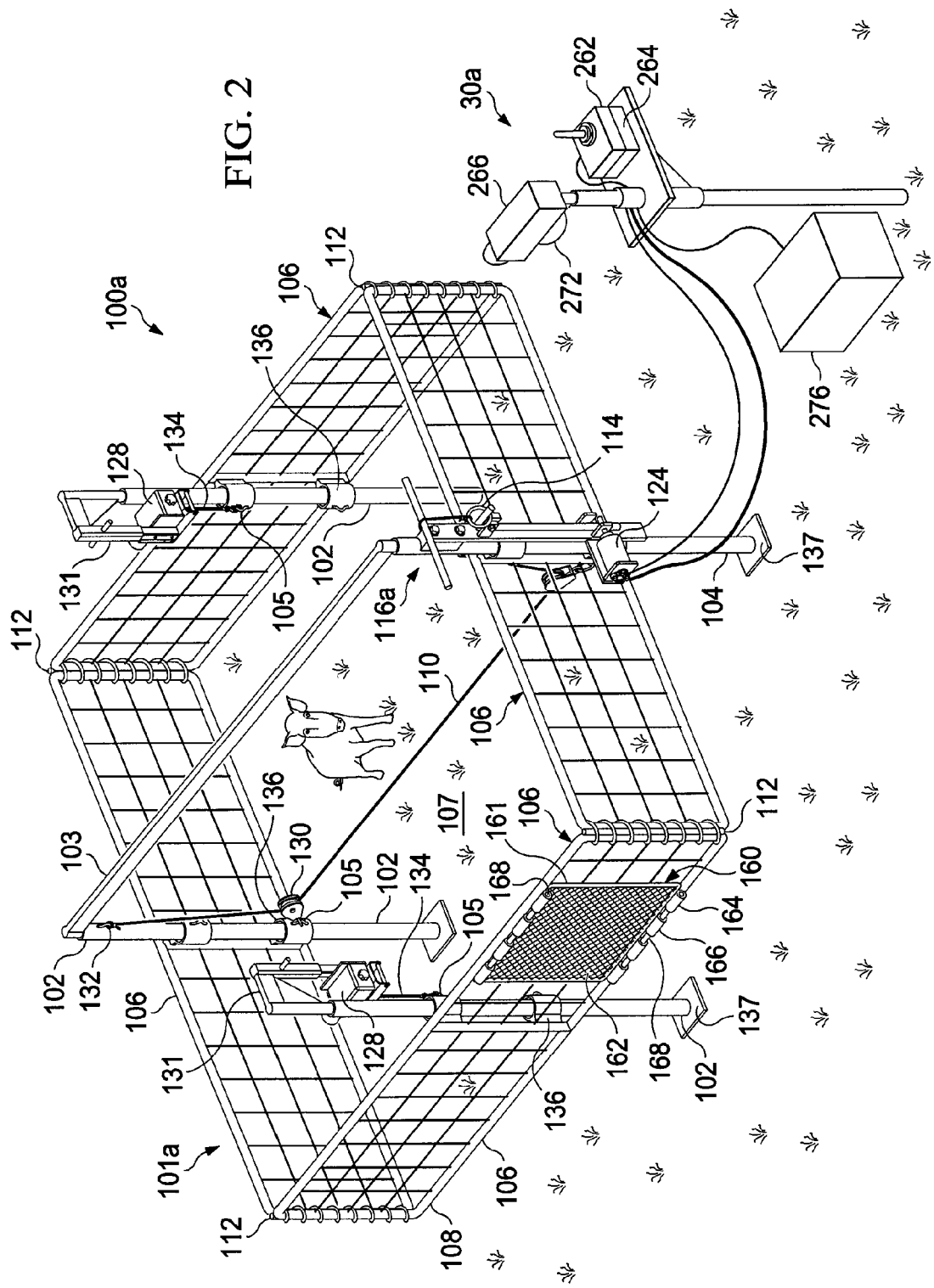
FIG. 2 is a perspective view of an illustrative embodiment of a system for trapping animals as shown in FIG. 1.

In some embodiments, the trap system 100a includes a cross-brace 103 that engages the base support 104 and a support member 102 opposite the base support 104 (i.e. across the enclosure 101a) to provide lateral rigidity to trap system 100a. In other embodiments, the trap system 100a may be configured and/or constructed so as to not require the cross-brace 103. While the embodiment of FIG. 2 shows a four-sided rectangular enclosure 101a, the enclosure 101a may be circular, triangular, hexagonal or any other shape. In one embodiment, the enclosure 101a is a corral-type enclosure having four panels 106. The enclosure 101a may be constructed from multiple panels or a single rigid frame.

In one embodiment, the release mechanism 116a includes an actuator 124 that actuates the release mechanism 116a in response to a signal received from the on-site system 30. In this embodiment reference is made to an actuator 124, wherein the actuator 124 may be a solenoid, an electro-mechanical device or other latch mechanism that may be actuated from a closed-biased position to an open position (or, alternatively, from an opened-biased position to a closed position) through the application of a signal, voltage or the like.

The panels 106 may be rigid panels that include frames constructed from structural framing materials. Many types of framing members could be used including without limitation rod, pipe, tubing, or L-shaped, C-shaped, or U-shaped channels, or any other suitable framing stock. The type of materials chosen may also vary, although in one embodiment, it may be advantageous to use steel because of the widespread availability of the material and the ease with which structural members may be joined by processes such as welding. Alternatively, it may be desirable to use aluminum or other metals as the material of choice for the framing members. Still other options may include structural plastics, fiberglass, or composites. The panels 106 may further include heavy-gauge wire mesh 141 that is supported by the framing members of the panels. The enclosure 101a is configured to be dropped from a height (h), and as such is suspendable from one or more suspension points 105 before it is dropped to the ground.

Figure 3:
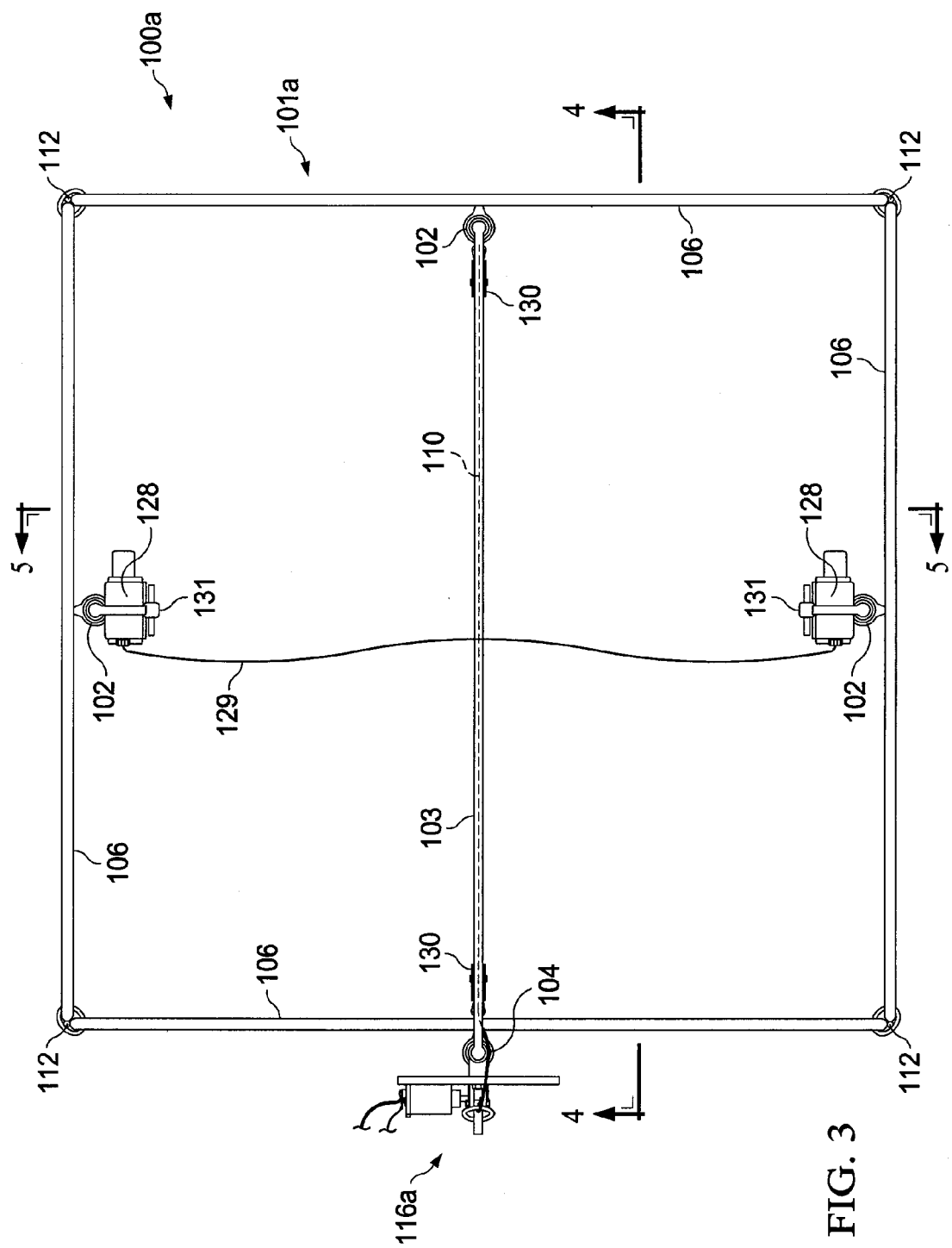
FIG. 3 is a plan view of the enclosure of FIG. 2.

In certain embodiments, a four-sided enclosure 101a as shown in FIG. 2 may be formed by four panels 106. The enclosure is constructed so that a first panel 106 slideably engages the base support 104. It is notable that the illustrated configuration of enclosure 101a is conducive for four panels 106; however, in the event that the enclosure 101 assumes a differing configuration (e.g. circular), as described above and illustrated in FIGS. 8 and 9, the enclosure 101 may be formed of fewer panels 106 for simplicity. As but one example, the enclosure 101 could comprise three panels 106. Such configuration may further enable fewer support members 102, wherein the enclosure 101 may generally associate one support member 102 per panel, provided such enclosure 101 is stable. Alternatively, to enable or facilitate transportability by an individual, the enclosure may be comprised of more panels 106, which can be effectively assembled to effect the intended enclosure 101, wherein in such configuration, there may not be a one-for-one correspondence between panels 106 and support members 102. Notwithstanding, additional panels 106 each slideably engage respective support members 102. As shown in FIGS. 2 and 3, each of the panels 106 may be coupled to another panel 106 at each end to form the four-sided enclosure 101a.

Couplings 112 at the ends of the panels 106 may form the corners of the enclosure 101a. Each coupling 112 may include, for example, a corner pin, binding or nut and bolts. Where the coupling 112 includes a binding, the ends of the panels 106 may be wrapped with a cable or rope to reinforce and hold the ends of the panels 106 together without the need for an additional fixed joint. Where the coupling 112 includes a pin, each end of each panel 106 may include a sleeve that receives a steel rod or pin to form a coupling 112 that is similar to an interlocking door hinge. Alternatively, each panel 106 may simply be secured an adjoining panel 106 through any fixed means known in the art, for example, nuts and bolts.

Figure 6:
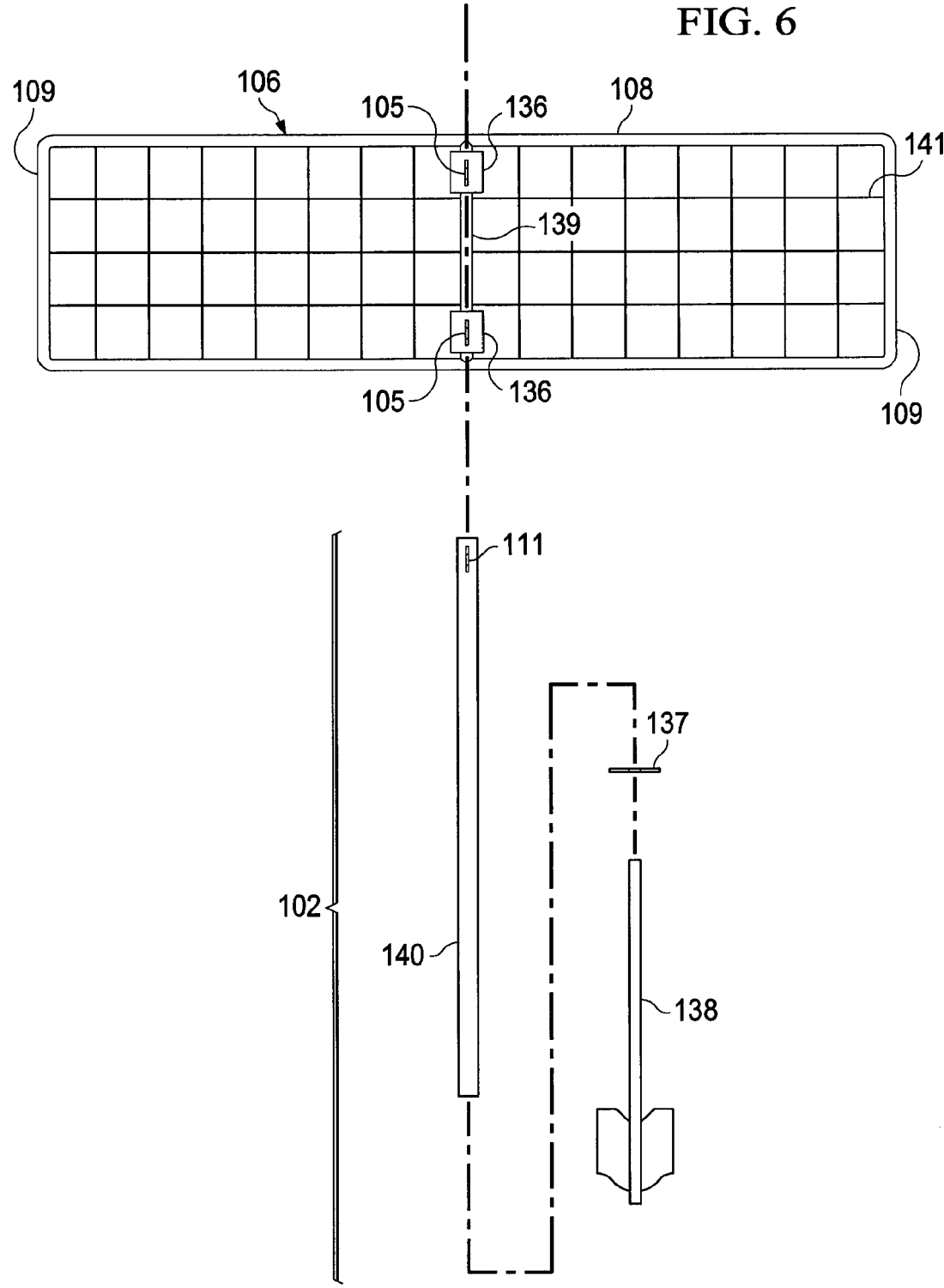
FIG. 6 is an exploded view of a panel of the system of FIG. 2, along with a support structure.

Referring more specifically to FIG. 6, each panel 106 may be formed by coupling two horizontal members 108 to two vertical members 109 to form a rigid, rectangular frame. The horizontal members 108 and vertical members 109 may be formed from any suitable material (including those listed previously), such as 1 inch steel square tubing, pipe or rod that is welded together at the ends to form the rectangular frame. The center of the panel 106 includes a center vertical member 139 formed from, for example, 1 inch×2 inch steel channel that is welded to the horizontal members 108. Within the frame formed by the horizontal members 108 and vertical members 109, the panel 106 includes a mesh 141, such as heavy-gauge, four-inch steel mesh that is also welded to the horizontal members 108 and vertical members 109.

In some embodiments, one or more of the panels 106 includes a door 160 that may also function as a loading ramp to remove animals that have been captured using the trap system 100. An exemplary door 160 shown in FIG. 4B includes a door frame 161 that is formed from welded steel, e.g. steel rods. The top and bottom of the door 160 include small sleeves 166 that form a portion of a hinge or coupling by interlocking with complementary small sleeves 164 that are mounted to the panel 106 on which the door 160 is installed. A pin 168 is inserted in the small sleeves 166 and complementary small sleeves 164 to form a hinge or coupling. For example, at the bottom of the door 160, the pin 168 may be installed to form a hinge that allows the door 160 to open and function as an exit point and a loading ramp to evacuate trapped animals. At the top of the door 160, the pin 168 may be temporarily installed to form a coupling that secures the door 160 in the panel 106 until the pin 168 is removed by a user to open the door 160. To facilitate use of the door 160 as a loading ramp, the door 160 may include a panel 162 that is suitable to form a walking surface for the trapped animals. The panel 162 may be formed from, for example, a steel grating, panel, or other type of expanded metal.

Each panel 106 further may include sleeves 136 to movably engage one of the support members 102 or base support 104. One or more sleeves 136 may be formed from steel pipe and welded to the top, bottom, or middle of the center vertical member 139. One or more of the sleeves 136 includes a suspension point 105. The suspension points 105 illustrated in FIGS. 2 and 4A-7 are eyelets that are welded to each sleeve 136 to enable a rope, cable, latch, clip, or similar component to attach to the panel 106. The suspension points 105 may also movably receive a cable or other flexible line to allow proper suspension and release of the enclosure 101a as described herein. In another embodiment, the suspension points 105 may comprise bolt holes, eye bolts, rigid pulley mounts, or similar features.

Functionally, the sleeves 136 of each panel 106 are configured to movably engage, or slide up and down, a support member 102 or the base support 104 so that the enclosure 101a can be raised to a suspended position and dropped to the ground. To facilitate movable engagement between the panels 106 and the support members 102 or base support 104, the sleeves 136 of each panel 106 are aligned to share a common axis that may be parallel to the center vertical member 139 during construction of the panel 106. When the trap system 100a is assembled, the sleeves 136 of the panels 106 that form the enclosure 101a movably engage the base support 104 or support members 102, which are arranged at the trap area 107.

In one embodiment shown in FIG. 6, each support member 102 is formed by an anchored member 138 that is configured to be anchored in the ground and an unanchored member 140 that fits over the anchored member 138. In one embodiment, the unanchored member 140 is steel pipe that slides over the anchored member 138, which is steel T-post that is driven into the ground around the trap area 107. The unanchored member 140 is sized relative to the anchored member 138 and sleeves 136 of the panels 106 such that the unanchored member 140 fits over the anchored member 138 while allowing the sleeves 136 to slide up and down the unanchored member 140 without binding. As such, the unanchored member 140 has an outer diameter that is slightly less than the inner diameter of the sleeves 136 and an inner diameter that is slightly larger than the width of the anchored member 138.

While the embodiment of FIG. 6 includes an unanchored member 140 and sleeves 136 that are round, other embodiments may include an unanchored member 140 and sleeves 136 of other shapes, such as shapes that are rectangular or oval in cross section. In one embodiment, a plate 137, such as a four-inch by four-inch steel plate with a hole in the middle may be installed over the anchored member 138 before the installation of the unanchored member 140. Alternatively, the plate 137 may be welded or otherwise attached to the bottom of the unanchored member 140 to produce an integrated element. The plate 137 prevents the unanchored member 140 from sinking into the ground and enables the trap system 107 to remain level.

While the support members 102 have been described herein as being anchored to a surface of the ground using a multiple components (i.e. one that is driven into the ground and a second that is positioned over the first), each support member 102 may instead be a unitary rod, pipe, or other piece of material that is driven into the ground. Alternatively, the support members 102 may be provided be positioned directly on the ground surface without driving any portion of the support members 102 into the ground. In this embodiment, a heavier base may be provide for each support member 102 to assist in stabilizing the support member 102; however, such enhanced base may not be required for typical operations.

The construction of the base support 104 is similar to the construction of the support members 102. The base support 104 and support members 102 are arranged about the trap area 107 to provide strength and rigidity to the trap system 100 and to establish parallel axes of movement for each panel 106 of the enclosure 101a. In the embodiment of FIGS. 2-5, the base support 104 supports the first panel 106, the first, second and third support members 102 supports respectively panels 106. The cross-brace 103 couples the base support 104 to the support member 102 located across the enclosure 101a and provides lateral rigidity to the trap system 100a by preventing the base support 104 and its slideably engaged panel 106 from being pulled toward the opposite support member 102 and its slide ably engaged panel 106. Notwithstanding, the trap system 100a may be configured and/or constructed so as to not require the cross-brace 103.

As described above, the enclosure 101a, base support 104, and support members 102 are installed at the trap area 107 so that the enclosure can be raised and suspended above the trap area 107. To raise the enclosure 101a into the suspended position, a winch 128 may be mounted at the top of one of the support members 102 and coupled to one of the panels 106. For example, in the embodiments shown in FIGS. 2, 3 and 5, the trap system 100a includes two winches 128 mounted to winch mounts 131 atop opposite support members 102. Each winch 128 is singularly coupled to the panel 106 slideably engaged by the support member 102 on which such winch 128 is mounted. The winches 128 may be electrically or mechanically coupled by a wire 129 that synchronizes the controls of the winches 128 so that the winches 128 will function in unison. This synchronization allows the enclosure 101a to be raised into a suspended position without inducing movement in any of the panels 106 in a direction that is not parallel to the base support 104 and support members 102. In another embodiment (not shown), a single winch 128 may be mounted to a winch mount 131, affixed to the cross-brace 103 or another location, and a single winch cable may be routed through pulleys 130 to raise the enclosure 101a to the suspended position.

Figure 4A:
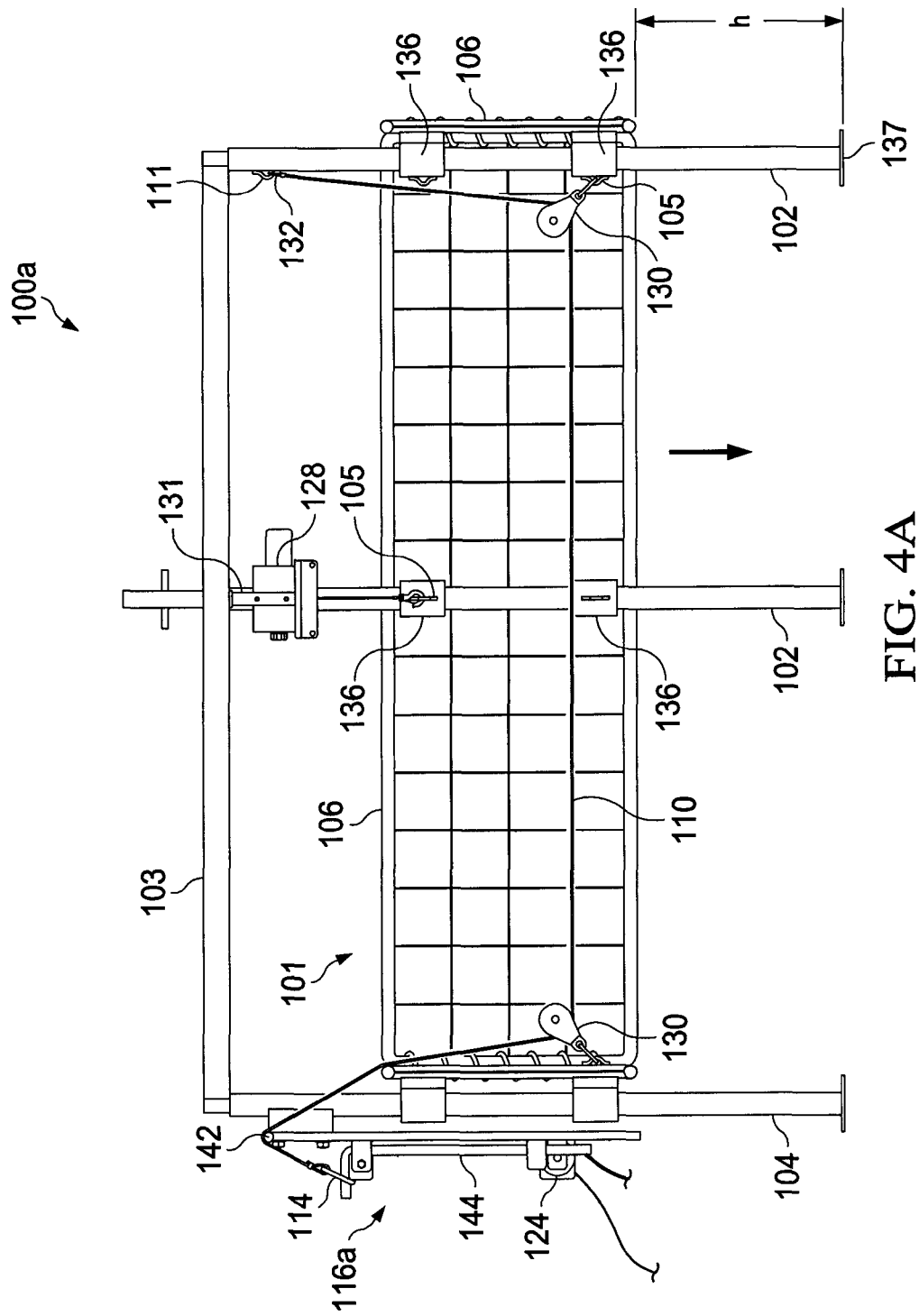
FIG. 4A is a cross-sectional side view of the system of FIG. 3, taken along the lines 4-4 of FIG. 3, in a suspended position, which shows an enclosure of the system.
Figure 5:
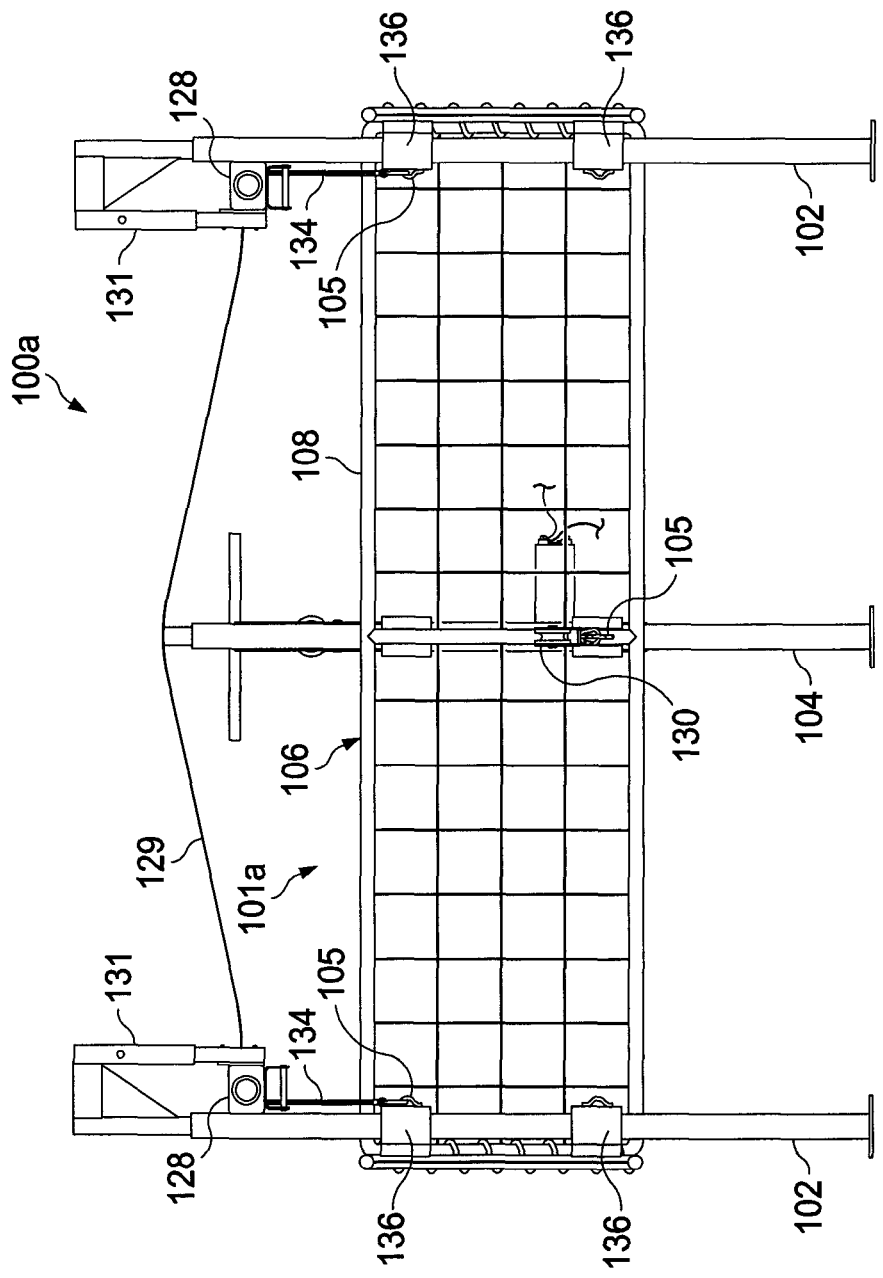
FIG. 5 is a cross-sectional side view of the system of FIG. 3, taken along the lines 5-5 of FIG. 3, in the suspended position, which shows the enclosure of the system.

FIGS. 2, 4A, and 5 show the enclosure 101a in a suspended position wherein the bottom of each panel 106 is offset from the ground at the trap area 107 by a height (h). In one embodiment, the enclosure 101a is offset from the ground at a height (h) of 36 inches. In other embodiments, the enclosure 101a may be offset at a height (h) of 30 inches to 50 inches. In another embodiment, the offset height (h) of the enclosure 101a may be selectable based on the height or eye level of the animal that the trap is being used to catch. For example, any height that is suitable to avoid detection by the animal would be a suitable height.

Figure 7:
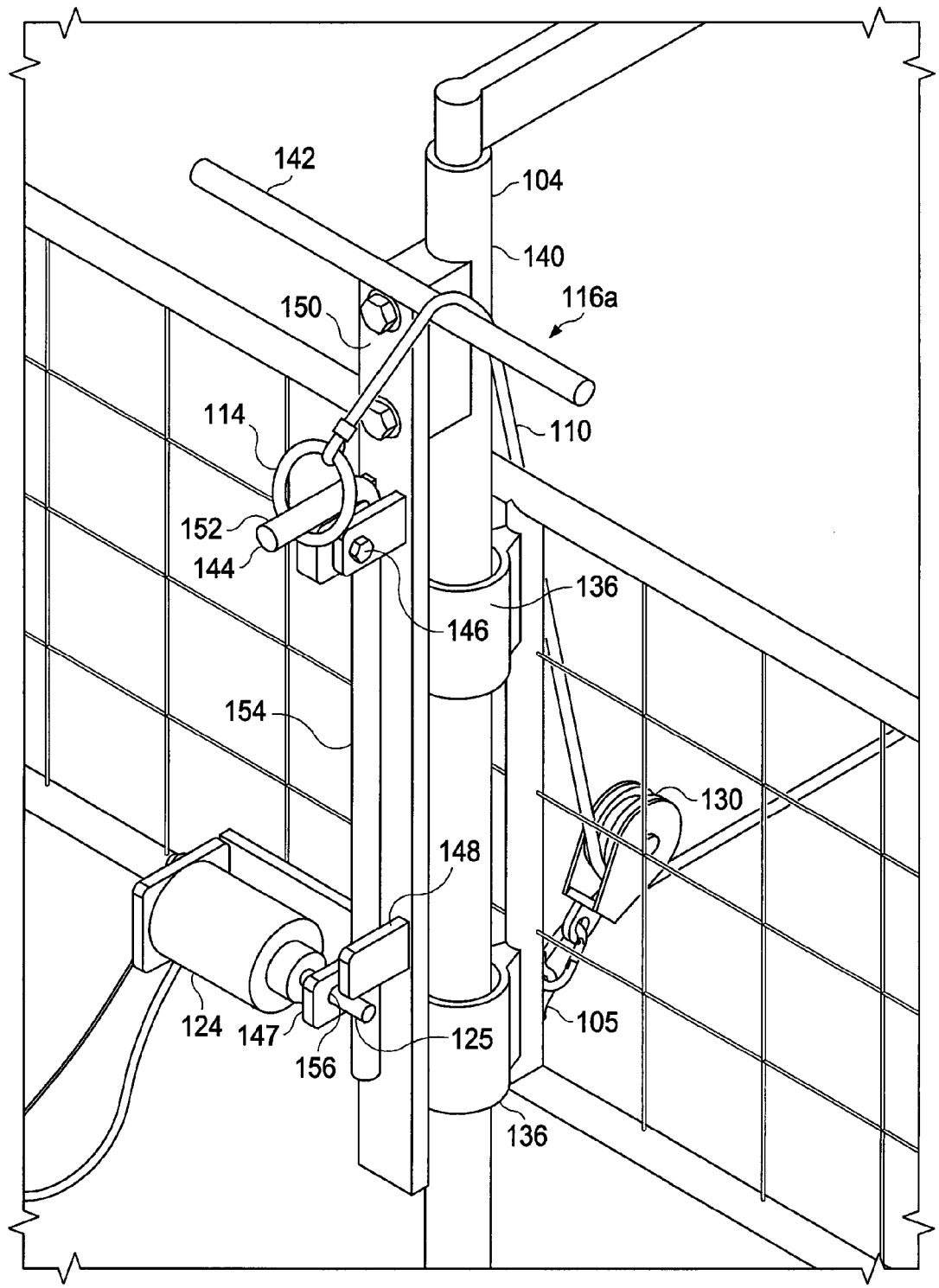
FIG. 7 is a perspective view of a portion of the system of FIG. 2 that includes a release mechanism used to actuate the enclosure.

In the suspended position, the enclosure 101a is releasably coupled to the release mechanism 116a. Referring to FIG. 7, the release mechanism 116a may be mounted to the base support 104 and coupled to a cable 110 to hold the enclosure 101 in the suspended position. To facilitate mounting the release mechanism 116a to the base support 104, the release mechanism 116a includes a release mechanism mount. The release mechanism mount may be a base plate 150 that is bolted to the base support 104 to provide a chassis for the components of the release mechanism 116a. The base plate 150 may be formed from any suitable material, including without limitation 1 inch×2 inch steel channel. In one embodiment, a crossbar 142 is coupled to the top of the base plate 150 to support the cable 110 when the enclosure 101a is suspended.

As shown in FIG. 7, the release mechanism 116a includes a pivotable member 144 that is capable of rotating about a pivot support 146. The pivotable member 144 comprises an L-shaped rod formed with a pivot point and two perpendicular sections. In the embodiment of FIG. 7, the perpendicular sections include a first leg 152, and a second leg 154 that is substantially perpendicular to the first leg 152. When the enclosure 101a is in the suspended position, the second leg 154 of the pivotable member 144 extends generally parallel to the base plate 150. The second leg 154 of the pivotable member 144 is stabilized on four sides by the base plate 150, a first stabilizing plate 148 that extends from the base plate 150, a second stabilizing plate 147 that also extends from the base plate 150 and is offset from the first stabilizing plate 148, and an actuator 125 of an actuator 124. In this configuration, the actuator 125 of the actuator 124 constrains the pivotable member 144 from rotating about the pivot support 146. To stabilize the actuator 124 and the actuator 125, the second stabilizing plate 147 includes an aperture 156 through which the actuator 125 of the actuator 124 extends, although the solenoid could operate independently of and without contacting the second stabilizing plate 147. In the embodiment illustrated in FIG. 7, however, the aperture 156 supports the actuator 125 and minimizes the forces exerted on the actuator 125 that are transverse to the desired direction of motion of the actuator 125 in and out of the actuator 124.

Referring now primarily to FIGS. 4A and 7, a releasable coupling between the enclosure 101a and release mechanism 116a includes an attachment member 114 and cable 110. Cable 110 may be a rope, a wire, or any other line that is strong enough to support the enclosure 101a yet flexible enough to be routed through pulleys or other suspension points. The attachment member 114 may be a loop in the cable 110, a latch or clip coupled to an end of the cable 110, or a ring, as shown in FIG. 7. The cable 110 may be a rope or belt made from any suitable material. To releasably couple the enclosure 101a to the release mechanism 116a, a first end of the cable 110 is coupled to the support member 102 on the opposing side of the enclosure 101a from the base support 104. The first end of the cable 110 may include a latch 132, clip, or loop of material that is coupled to an upper suspension point 111 at the top of such support member 102. The cable 110 is routed down from the upper suspension point 111 at the top of such support member 102 through pulleys 130 that are attached to suspension points 105 near the bases of the panel 106 slideably engaging base support 104 and the panel 106 slideably engaging the support member 102 on the opposing side of the enclosure 101a. A second end of the cable 110 includes the attachment member 114, and is routed over the crossbar 142 where the attachment member 114 is releasably coupled to the first leg 152 of the pivotable member 144 of the release mechanism 116a.

In the embodiment illustrated in FIG. 7, the attachment member 114 is a ring that is releasably coupled to the release mechanism by sliding the ring over the first leg 152 of the pivotable member 144. When the attachment member 114 is releasably coupled to the release mechanism, the tension in the cable 110 maintains the enclosure 101a in the suspended position by exerting an upward force on the suspension points 105 to which the pulleys 130 are coupled. The tension in the cable 110 also exerts a force on the first leg 152 of the pivotable member 144 of the release mechanism. This force generates a moment on the pivotable member 144 about the pivot support 146 that is resisted by the actuator 125 of the actuator 124, which constrains the pivotable member 144 from rotating when the solenoid is in an engaged position.

As an alternative to the configuration of FIG. 7, the cable 110 may be routed over any suitable path that results in the enclosure 101 being releasably suspended by the release mechanism 116a. For example, in one embodiment, the first end of the cable 110 may be attached to the panel 106 (opposite the base support 104) at a suitable location, such as sleeve 136. The cable 110 may be routed through a pulley 130 located at the top of the support member 102 (slidably engaged to such panel 106) and over the crossbar 142 where the second end of the cable 110 releasably couples to the first leg 152 of the release mechanism 116a. The second end of the cable 110 may include an attachment member 114 that releasably couples to the first leg 152, as described above. In this embodiment, a second cable is routed over the crossbar 142 from a suspension point 105 on the panel 106 (slideably engaging base support 104) to the first leg 152. The second cable may be attached to the release mechanism 116a in the same manner as the first cable, e.g. by releasably coupling an attachment member 114 to the first leg 152 of the release mechanism 116a. In this embodiment, the enclosure 101a is suspended by both the first cable 110 and the second cable, both of which are releasably coupled to the first leg 152 of the release mechanism 116a. Once coupled, the tension in the cables exerts a net force on the first leg 152 of the pivotable member 144 of the release mechanism 116a. This net force generates a moment on the pivotable member about the pivot support 146. The moment is resisted by the actuator 125 of the actuator 124, which constrains the pivotable member 144 from rotating until the release mechanism is released.

After the enclosure 101a is raised to the suspended position and releasably coupled to the release mechanism 116, the winch cable 134 may be decoupled from the enclosure 101 so that the enclosure is suspended by the cable 110 as described above. In this configuration, the trap system 100a is in a ready state because the enclosure 101a will quickly drop to the ground when the releasable coupling between the enclosure 101a and release mechanism 116a is released.

The releasable coupling is configured so that the release mechanism 116a, when actuated, releases the attachment member 114 and second end of the cable 110. When the second end of the cable 110 is released, the cable 110 no longer resists the weight of the enclosure 101a to maintain the enclosure 101 in the suspended position. The unsuspended enclosure 101a drops rapidly to the ground, trapping and holding any animals that are within the footprint of the enclosure 101a, i.e. within the trap area 107.

Figure 4B:
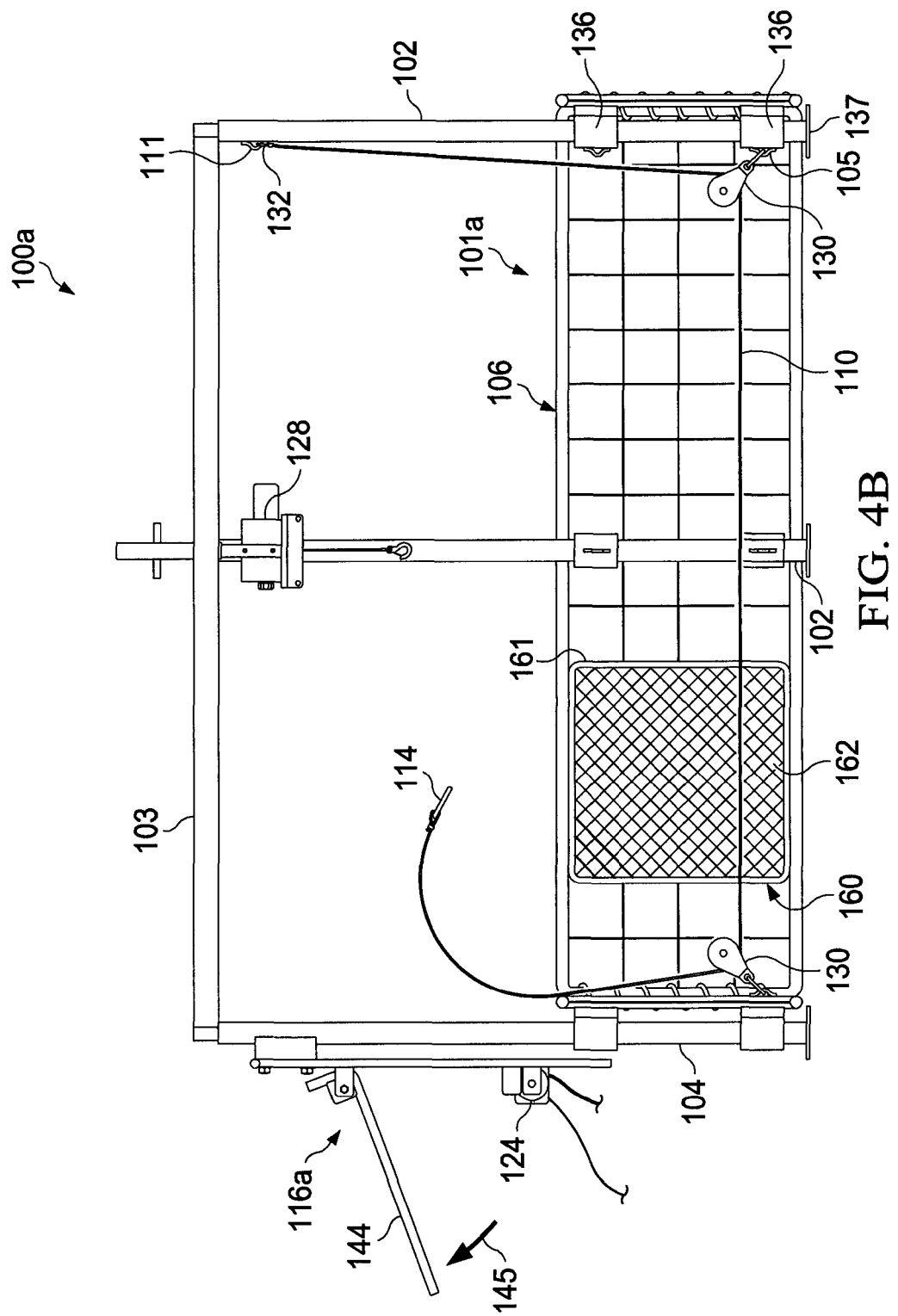
FIG. 4B is cross-sectional side view of the system of FIG. 3, taken along the lines 4-4 of FIG. 3, in a lowered position which shows the enclosure of the system.

FIGS. 4A and 4B show the trap system 100a with the enclosure 101a in the suspended state and dropped state, respectively. In the suspended position of FIG. 4A, the bottom of the enclosure 101a is maintained at a height (h) by the tension in the cable 110. As described above, the tension of the cable 110 is maintained by coupling the first end of the cable 110 to the latch 132 at the top of the support member 102 opposite to the base support 104. At the second end of the cable 110, tension in the cable 110 is maintained by the releasable coupling between the attachment member 114 and the release mechanism 116a.

When the release mechanism 116a is actuated, the actuator 125 of the actuator 124 is drawn into the body of the actuator 124 leaving the second leg 154 of the pivotable member 144 of the release mechanism 116a unconstrained and free to rotate about the pivot support 146. The unconstrained pivotable member 144 is motivated to rotate about the pivot support 146 by the weight of the enclosure 101a. The weight of the enclosure 101a exerts a downward force on the cable 110 that is translated into an upward force on the attachment member 114 as a result of routing the cable 110 over the crossbar 142. The upward force on the attachment member 114 is applied to the first leg 152 of the pivotable member to generate a moment about the pivot support 146. The moment causes the unconstrained pivotable member 144 to rotate so that the first leg 152 rotates upward and the second leg 154 rotates away from the base plate 150, as indicated by the arrow 145 of FIG. 4B. The upward rotation of the first leg 152 of the pivotable member allows the attachment member 114 to slide off the first leg 152, thereby releasing the attachment member 114 and second end of the cable 110. When the attachment member 114 is released by the release mechanism 116a and the cable 110 is free to move through the pulleys 130, the enclosure 101a is released and quickly drops to the ground as shown in FIG. 4B.

The specific orientation and configuration of both the actuator 124 and the pivotable member 144 is driven by the illustrated embodiment. Notwithstanding, the actuator 124 may be any electro-mechanical device or other latch mechanism (e.g. an electronic gate latch) that may be actuated from a closed-biased position (engaged) to an open position (disengaged) (or, alternatively, from an opened-biased position (disengaged) to a closed position (engaged)) through the application of a signal, voltage or the like. In a different orientation or configuration, the pivotable member 144 may assume an alternative configuration or shape; provided however, the pivotable member 144 (a) is rotatable about a pivot support 146, (b) includes a portion that releasably engages an electro-mechanical device selectable between an engaged and disengaged position and (c) includes a portion that directly or indirectly engages the enclosure 101 to selectively maintain the enclosure 101 in a suspended position (when the portion of the pivotable member 144 is likewise rotated and engaged by such electro-mechanical device).

Referring now to the illustrative embodiments of FIGS. 8-11B, a trap system 100 includes an enclosure 101b, having a circular configuration, that is comprised of a first enclosure 1200 and a concentrically arranged second enclosure 1250 about a centerline 1205. As illustrated, the first enclosure 1200 is sized to concentrically receive the second enclosure 1250 within the inner diameter of the first enclosure 1200; however, the enclosure 101b could readily be configured so that second enclosure 1250 is sized to concentrically receive the first enclosure 1200 within the inner diameter of the second enclosure 1250.

Figure 10A:
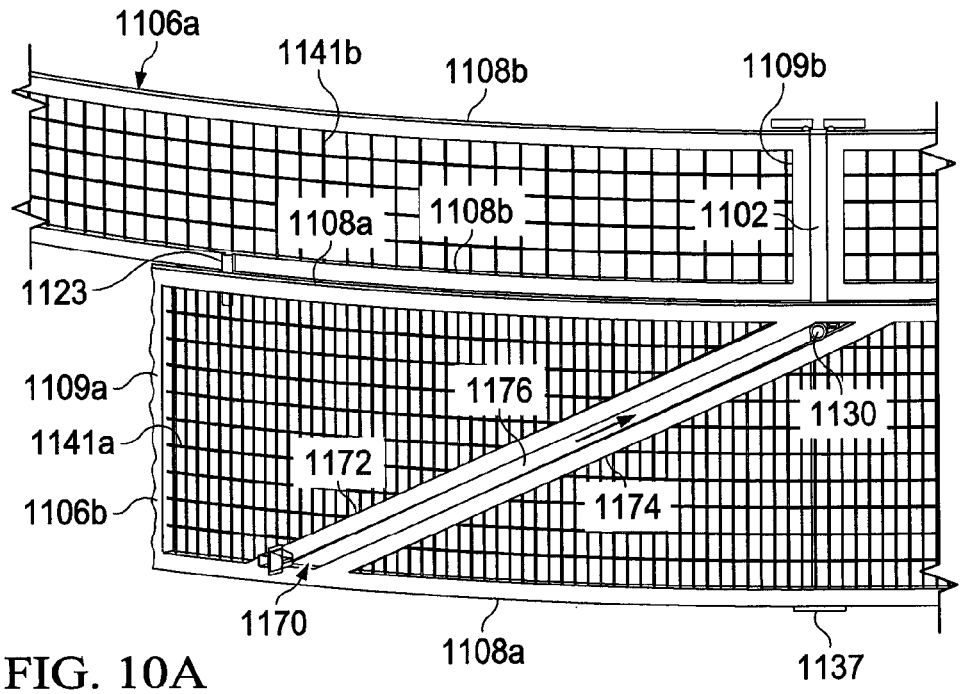
FIG. 10A is a cross-sectional side view of a single panel of the enclosure of FIG. 9, taken along the lines 10-10 of FIG. 9, in a lowered position, which shows an enclosure of the system.
Figure 10B:
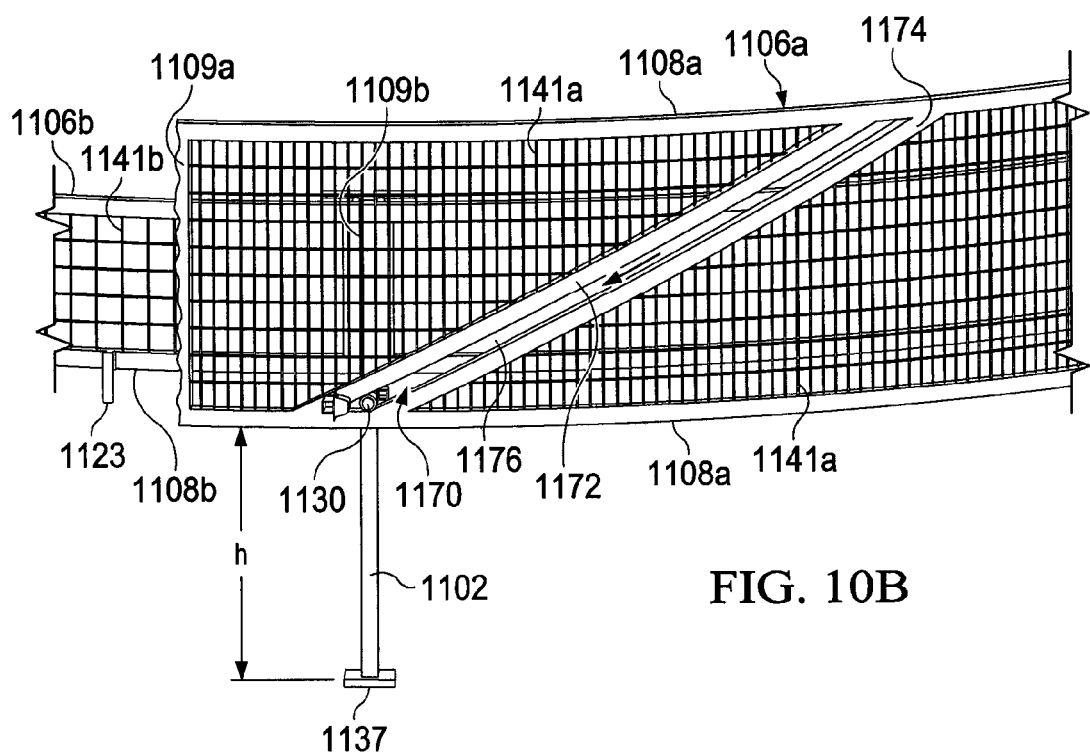
FIG. 10B is a cross-sectional side view of a single panel of the enclosure of FIG. 9, taken along the lines 10-10 of FIG. 9, in a suspended position, which shows an enclosure of the system.

The illustrative embodiments of the first enclosure 1200 and the second enclosure 1250 are comprised of multiple panels 1106. The use of panels 1106 enhance the transportability of the overall enclosure 101b can be readily transported or carried to a trap site 107 by one or more individuals, if necessary, and assembled/disassembled, as needed, to create the trap system 100. The functional interaction of a panel 1106a of the first enclosure 1200 relative to a corresponding panel 1106b of the second enclosure is shown in FIGS. 10A and 10B to illustrate the overall operation of this embodiment of this enclosure 101b.

Returning to FIG. 8, the illustrated second enclosure 1250 is comprised of three panels 1106b separated and operatively connected to support members 1102 and a base member 1104. Each support member 1102 is formed of steel tubing, for example, 1½-2 inch square steel tubing, which may or may not be formed to include plate 1137 for resting on the ground at the trap area 107. The plate 1137 may be configured to receive an anchor to secure the enclosure 101b to the ground.

Each panel 1106b may be secured to a support member 1102 (or base member 1104) through nuts and bolts, pins and clips, a pin and sleeve system 1112 or other joinder method. For the pin and sleeve system, each end of panel 1106b includes a staggered arrangement of sleeves that are capable of mating with a matched arrangement of sleeves on each support member 1102 and base member 104. To assemble, a panel 1106b is positioned relative to a support member 1102 (or base member 1104) so that the sleeves of such panel 1106b are interposed within the sleeves of the mating support member 1102 (or base member 1104) and a pin 1112 is passed through such sleeves to secure such panel 1106b to such support member 1102 (or base member 1104).

Each panel 1106b may be formed by coupling two horizontal members 1108b to two vertical members 1109b to form a rigid, rectangular curved frame. Vertical members 1139b may be interposed between vertical members 1109b so as to span between horizontal members 1108b to increase panel rigidity. The horizontal members 1108b and vertical members 1109b may be formed from any suitable material (including those listed previously), such as 1-1½" inch steel square tubing, pipe or rod that is welded together at the ends to form the rectangular frame. Within the frame 1106b formed by the horizontal members 1108b and vertical members 1109b, each panel 1106b includes a mesh 1141b, such as heavy-gauge, four-inch steel mesh that is also welded to or otherwise secured the horizontal members 1108b and vertical members 1109b.

Secured to each support member 1102 and base member 1104 is a roller 1130. Each roller 1130 is formed by a central arm, securable to the support member 1102 or base member 1104, which carries one or more bearings and an outer sleeve that engages and supports the first enclosure 1200 in a manner discussed in greater detail below. In an embodiment illustrated in FIG. 8, the rollers 1130 are positioned on the support members 1102 and base member 1104 below the lower horizontal members 1108b of the panels 1106b. Notwithstanding, an alternative embodiment of roller 1130 placement will be discussed below relative to FIG. 10C. The roller 1130 is but one embodiment, roller 1130 may instead take the form of a structural element (e.g. a steel bar), a wheel that engages a complementary track or other similar structure that functions in a capacity as described below.

In one embodiment, secured to base member 1104 is a first receiver 1132 at or about the lower horizontal member 1108b of the corresponding panel 1106b. The first receiver 1132 is adapted to operatively receive the release mechanism 116b when the enclosure 101b is operatively assembled. Likewise, secured to a support member 1102 is a second receiver 1134 at or about the lower horizontal member 1108b of the corresponding panel 1106b. The second receiver 1134 is adapted to operatively receive a lifting mechanism 1125 when the enclosure 101b is operatively assembled. The first receiver 1132 and second receiver 1134 may take many forms, but in a simplistic form, they are formed from square tubing having an inner dimension that may accept an outer dimension of the release mechanism 116b and the lifting mechanism 1125, respectively.

In one embodiment, secured to the lower horizontal member 1108b of each panel 1106b is a vertical guide 1123 to control and guide the movement of the first enclosure 1200 relative to the second enclosure 1250 during operation, which will be described below. The vertical guide 1123 may be a structural element, for example, a steel bar, or a roller. Notwithstanding, the vertical guide 1123 is designed to be positioned within the marginal gap 1124 located between the concentric arrangement of the first enclosure 1200 and the second enclosure 1250.

The illustrated first enclosure 1200 likewise is comprised of three panels 1106a. Each panel 1106a is joined to an adjacent panel 1106a using nuts and bolts, pins and clips, a pin and sleeve system or other joinder method. Each panel 1106a may be formed by coupling two horizontal members 1108a to two vertical members 1109a to form a rigid, rectangular, curved frame. Vertical members 1139a may be interposed between the vertical members 1109a so as to span between the horizontal members 1108a to increase panel rigidity. Likewise, spiral members 1140 may be used so as to span between the horizontal members 1108a along a diagonal line/spiral to also increase panel rigidity. While the illustrated embodiment shows the spiral members 1140 spanning between the horizontal members 1108a, such spiral members 1140 may span between one horizontal member 1108a and a vertical member 1139a. The horizontal members 1108a and vertical members 1109a may be formed from any suitable material (including those listed previously), such as 1-1½" inch steel square tubing, pipe or rod that is welded together at the ends to form the rectangular frame. Within the frame 1106a formed by the horizontal members 1108a and vertical members 1109a, for the most part (except as described below) each panel 1106a includes a mesh 1141a, such as heavy-gauge, two-by-four-inch steel mesh that is also welded to or otherwise secured the horizontal members 1108a and vertical members 1109a.

Each panel 1106a includes a spiral guide 1170 that is shown to be comprised of an upper guide 1172 and a lower guide 1174. The spiral guide 1170 rises at an angle (a) equal to or greater than 20-degrees and less than 90-degrees. In a preferred embodiment, the angle (a) is equal to or between 20-degrees and 30-degrees, equal to or between 30-degrees and 40-degrees, equal to or between 40-degrees and 50-degrees, equal to or between 50-degrees and 60-degrees, equal to or between 60-degrees and 70-degrees, equal to or between 70-degrees and 80-degrees, or equal to or between 80-degrees and 89.99-degrees. The upper guide 1172 and lower guide 1174 are preferably parallel in arrangement so as to define a path 1176 having an upper and lower limit, wherein the lower limit in this illustrated embodiment is the lower horizontal member 1108a and the upper limit in this illustrated embodiment is the upper horizontal member 1108a. Variants in establishing these upper and lower limits will be more fully described in the context of FIGS. 10A-10C. In the illustrated embodiment, the mesh 1141a does not span across the path 1176, instead being secured to the upper guide 1172 and the lower guide 1174, thereby leaving the paths 1176 open to allow free movement of the corresponding rollers 1130 therein. Notwithstanding, the mesh 1141a could span such path 1176 or, as with some of the other proposed configurations and structures contemplated herein for the spiral guide 1170, there may be no interruption of the mesh 1141a.

The illustrated embodiment of the spiral guide 1170 shows two independent elements, an upper guide 1172 and a lower guide 1174, to define path 1176; however, this is but one possible structure. The spiral guide 1170 can be defined by a single, spirally-shaped steel channel (e.g., C-channel or U-channel), which would receive a complementary roller 1130 (as described above) that would conform to or set within such channel. The spiral guide 1170 could be a single section of tubing, T-beam or I-beam, to which the roller 1130 rests or—in addition to the examples cited above—the roller 1130 may represent a trolley configuration (e.g. having opposing wheel(s) for which a pathway is defined there between) wherein such spiral guide 1170 is received within such roller 1130 and passes through such pathway.

Figure 9:
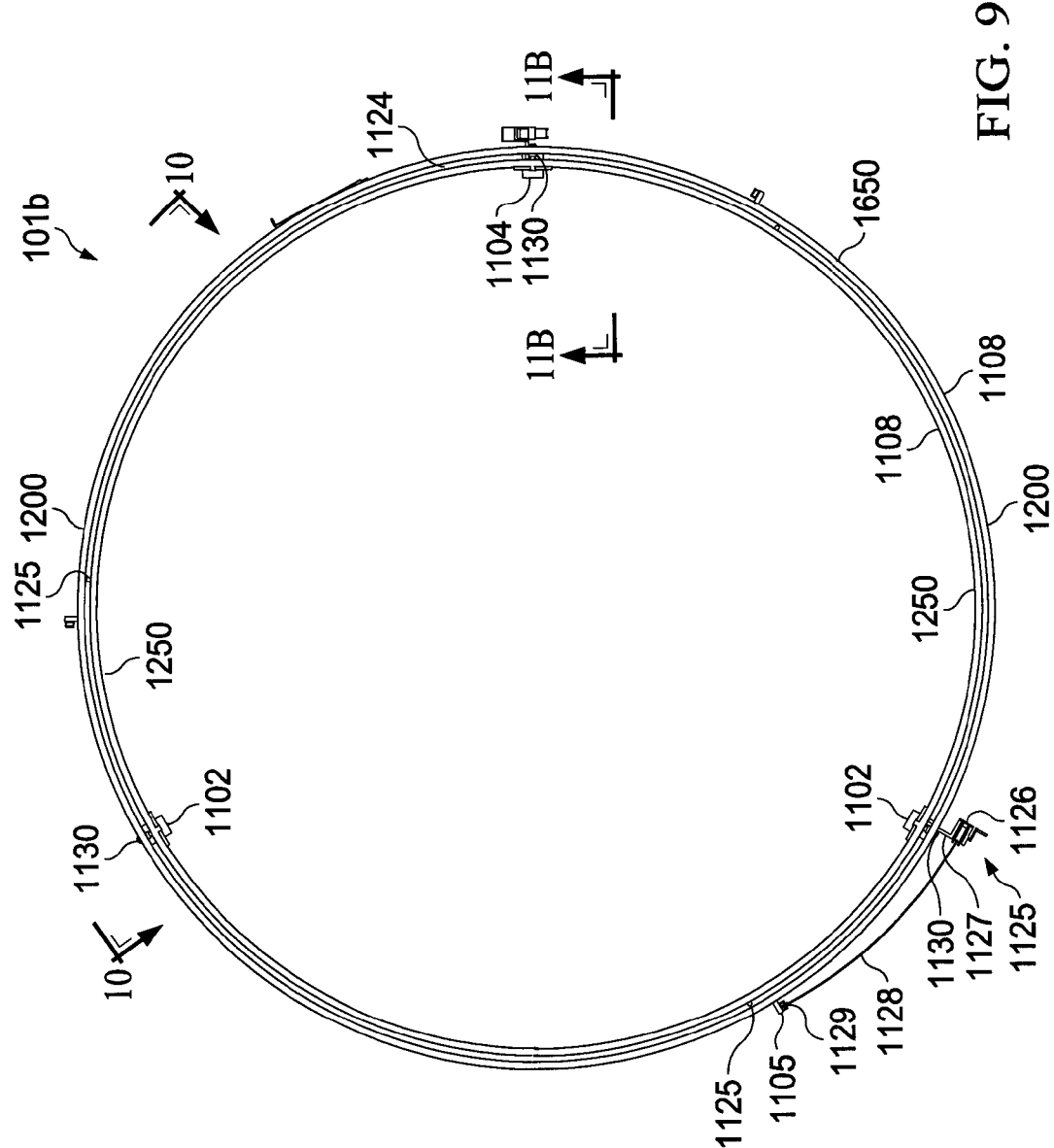
FIG. 9 is a plan view of the enclosure of FIG. 8.

Returning to the illustrated embodiment, and in reference to FIGS. 9, 10A and 10B, each track 1176 operatively receives a corresponding roller 1130 within the path 1176, and each such roller 1130 travels within such path 1176 during the movement of the first enclosure 1200 relative to the second enclosure 1250. Operatively, and in reference to FIGS. 10A and 10B, in a lowered position of the enclosure 101b, each panel 1106b would rest on the ground at the trap area 107. In such position, the roller(s) 1103, operatively positioned within path(s) 1176, would rest at or near the upper boundary of path 1176. To raise the enclosure 101b to a suspended position, the first enclosure 1200 is moved relative to the second enclosure 1250. The interaction between the spiral guide(s) 1170 and the roller(s) 1130 effect a rotation of the first enclosure 1200 relative to the second enclosure 1250. This rotation translates to a raising of the first enclosure 1200 from the ground and, thus, a raising of the enclosure 101b. When the lower horizontal member 1108a of the first enclosure 1200 is offset from the ground at the trap area 107 by a height (h), the roller(s) 1130 would rest at or near the lower boundary of path(s) 1176.

Figure 10C:
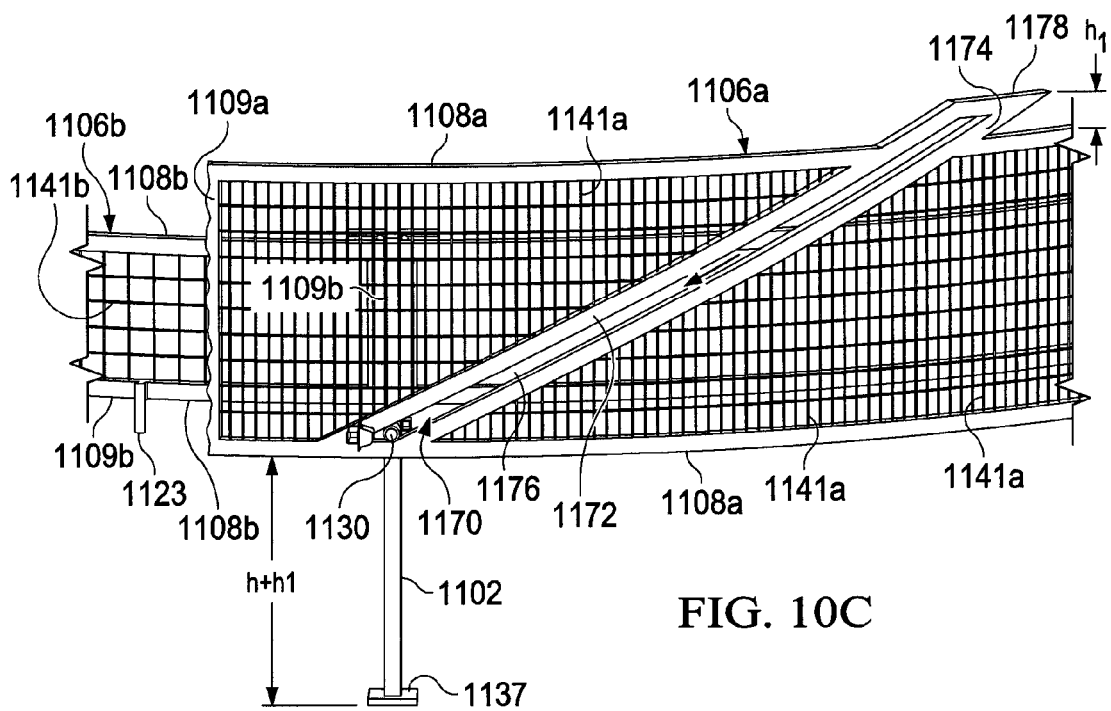
FIG. 10C is a cross-sectional side view of a single panel of the enclosure of FIG. 9, taken along the lines 10-10 of FIG. 9, in a suspended position, which shows an alternative configuration of the enclosure of the system, which allows for the enclosure to be raised to an elevated height relative to the configuration illustrated in FIGS. 10A and 10B.

FIG. 10C illustrates another embodiment of the enclosure 101b, wherein the path 1176 is effectively extended beyond the upper horizontal member 1108a of the first enclosure 1200. The illustrated panel 1106a may be constructed with a greater height; however, this adds additional (and potentially unnecessary) weight and costs (for materials). In the present alternative embodiment, both the upper guide 1172 and the lower guide 1174 of the spiral guide 1170 are extended above the upper horizontal member 1108a of the panel 1106a. The upper boundary of the path 1176 is provided by the addition of a secured plate 1178. The relative height of the plate 1178 above the upper horizontal member 1108a is approximately equal to height (h1). With this configuration, it is noted that the corresponding roller 1130 may be now secured on the shown support member 1102 higher than the earlier described embodiment (for example, FIG. 10B) by a height approximately equal to height (h1). Accordingly, for this alternative embodiment, when the lower horizontal member 1108a of the first enclosure 1200 is offset from the ground at the trap area 107 by a height (h+h1), the roller(s) 1130 would rest at or near the lower boundary of path(s) 1176.

Figure 8:
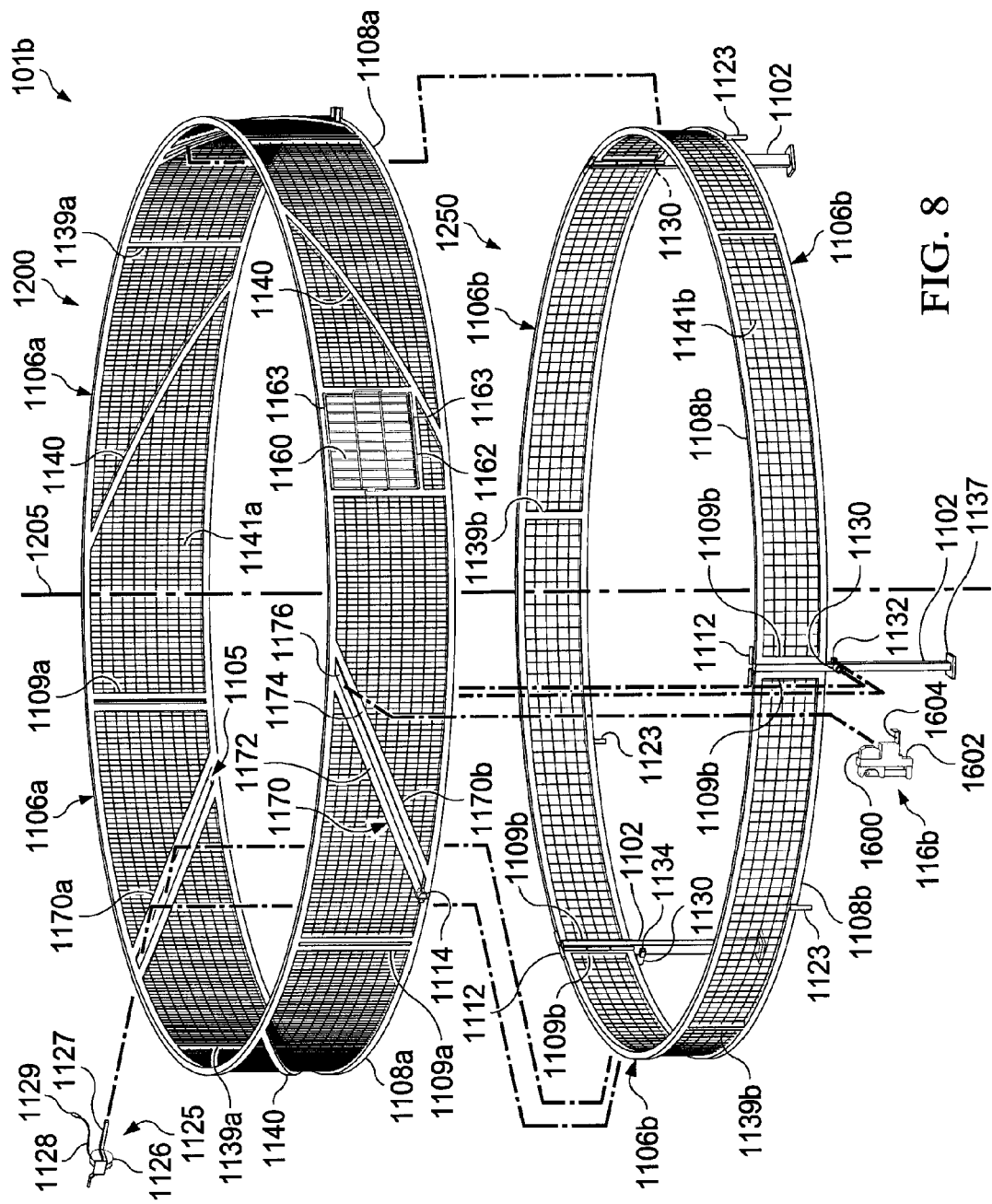
FIG. 8 is a perspective, exploded view of an illustrative embodiment of an enclosure for trapping animals as shown in FIG. 1.

As shown in FIG. 8, one or more of the panel 1106a includes a door 1160 to enable the removal of animals that have been captured using the trap system 100. The door 1160 shown in FIG. 8 includes a frame with a series of narrowly arranged steel bars. The door 1160 may take any like configuration to effect animal containment within the enclosure 101. The door 1160 is guided and carried by guides 1163 that operatively engage an upper and lower frame of the door 1160. The door 1160 may be slid from an open position to a closed position using guides 1163. The door 1160 may be secured in place using a pin or other similar element.

Lifting mechanism 1125 is shown in FIG. 8. Lifting mechanism 1125 may include a simple hand operated winch 1126, but may also be an electric wench or other device that enables at least the controlled take up of a line 1128. In certain embodiments, the winch 1126 has an intermediate locking system that permits the user to halt the raising of the first enclosure 1200 at any point, retain such position and resume raising at will. The intermediate locking system provides the user with a safety element when changing the relative position of the first enclosure 1200 relative to the second enclosure 1250. The winch 1126 may be mounted to a frame 1127. Frame 1127 is configured to be received by and within the second receiver 1134. Once received, the lifting mechanism 1125 can be secured in place using a nut and bolt, pin, clip or the like. The winch 1126 carries a line 1128, which may be a rope, wire or any other material that is strong enough to support the first enclosure 1200; provided however, based on the support of the first enclosure 1200 by the second enclosure 1250 and the slidable interaction therebetween, the force carried by the line 1128 is considerably less than the full weight of the first enclosure 1200. This configuration reduces the effort on the user to raise the first enclosure 1200 to the suspended position. At the end the line 1128 is a clip 1129, which is configured to engage a suspension point 1105. Suspension point 1105 is an eyelet welded or otherwise secured to the lower horizontal member 1108a of the first enclosure 1200. The suspension point 1105 is located proximate to the lower boundary of path 1176 of the spiral guide 1170a.

Figure 11A:
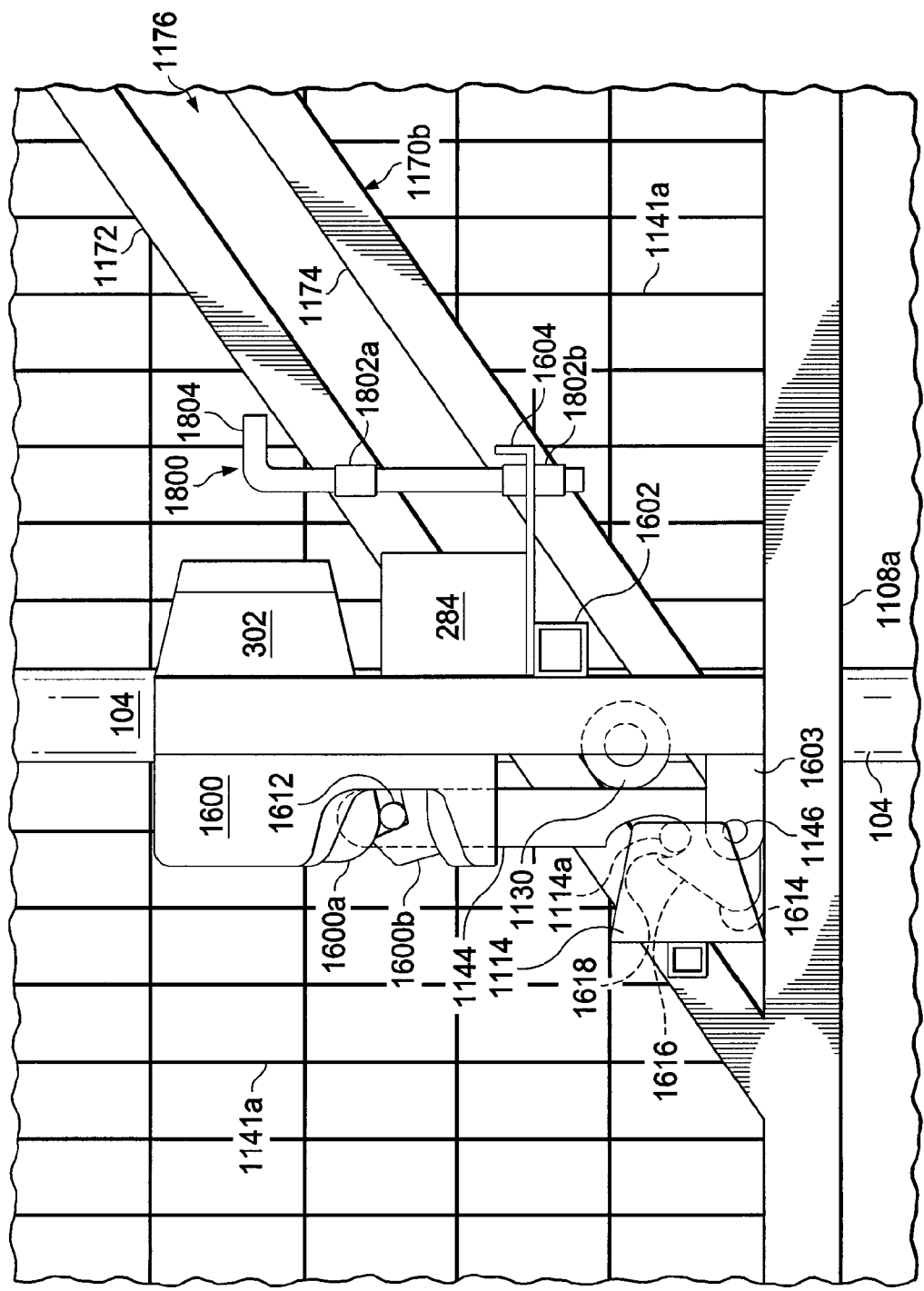
FIG. 11A is a side view of a portion of the system of FIG. 9 that shows an embodiment of a release mechanism used to actuate the enclosure.
Figure 11B:
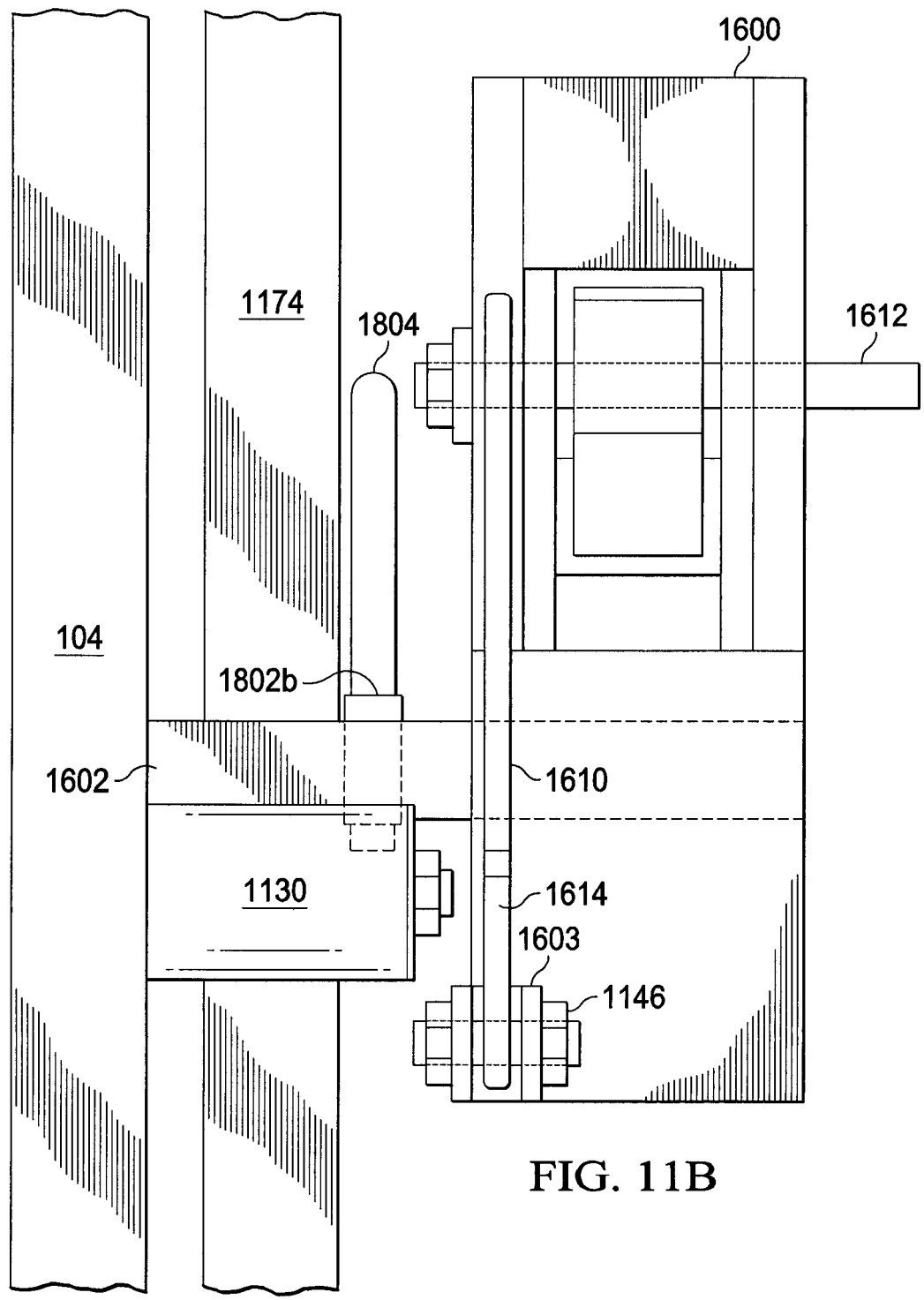
FIG. 11B is a cross-sectional side view of FIG. 9, taken along the lines 11B-11B of FIG. 9, which shows the release mechanism of FIG. 11A.

Release mechanism 116b is shown in FIGS. 8, 11A and 11B. Release mechanism 116b includes actuator 1600, frame 1602, power source 284 (FIGS. 11A and 12B), enclosure control 302 (FIGS. 11A and 12B), pivotable member 1144, pivot support 1146, latch pin 1612 and attachment member 1114. The actuator 1600 may be a solenoid, an electro-mechanical device or other latch mechanism that may be actuated from a closed-biased position to an open position (or, alternatively, from an opened-biased position to a closed position) through the application of a signal, voltage or the like. As shown, the actuator 1600 is an electro-mechanical device that includes an upper jaw 1600a and a lower, actuable jaw 1600b which can move from a released position (i.e. open lower jaw 1600b) (not shown) and an engaged position (as shown) where the upper jaw 1600a and the lower jaw 1600b are in proximate contact. As shown, the upper jaw 1600a and the lower jaw 1600b can encompass and retain (or release) the latch pin 1612. The actuator 1600 is mounted to the frame 1602. The frame 1602 is configured to be received by and within the first receiver 1132. Once received, the release mechanism 116b, and specifically, the frame 1602, may be secured in place using a nut and bolt, pin, clip or the like.

The frame 1602 includes a platform 1604, which supports and carries a power source 284, which may take the form of a battery but may also take the form of power sources such as a solar panel. The frame 1602 or the platform 1604 may also support the enclosure control 302, which is an element of the on-site system 30 and operatively communicates and receives instructional signals from with the controller unit 300. The enclosure control 302 and the actuator 1600 are connected (FIG. 12B), so that instructional signals from a user, issued through a user device 20, are transmitted via the server 40 and IP network 50 to the controller unit 300, to effect an engaged position or a disengaged position of actuator 1600.

As shown in FIGS. 11A and 11B, the release mechanism 116B includes a pivotable member 1144 that is capable of rotating about a pivot support 1146. At one end of the pivotable member 1144, is the latch pin 1612, which is constructed to extend out from and perpendicular to the pivot support 1146. The latch pin 1612 may take a variety of forms, but should be constructed so as to be received and selectively retained within the actuator 1600 to prevent the pivotable member 1144 from pivoting around the pivot support 1146. In this illustrated embodiment, the diameter of the latch pin 1612 is selected so as to be fully engaged by and held by the upper jaw 1600a and the lower jaw 1600b when such jaws are in the engaged position. At the opposite end of the pivotable member 1144, a retention portion 1614 is provided proximate to the pivot support 1146. The retention portion 1614 includes a ramp surface 1616 that operatively engages a pin member 1114a of attachment member 1114 during the raising of the enclosure 101b and guides the pin member 1114a to a retention location 1618 of the pivotable member 1144 (when the latch pin 1612 is engaged by the actuator 1600). Consistent with above, the pivotable member 1144 comprises an element having (a) a pivot support, (b) a portion that releasably engages an electromechanical device selectable between an engaged and disengaged position and (c) a portion that directly or indirectly engages the enclosure 101 to selectively maintain the enclosure 101b in a suspended position. The pivotable member 1144 is secured to the frame 1602 through a tab 1603, which carries the pivot support 1146.

Another element of the illustrated embodiment of the release mechanism 116b is the attachment member 1114, which is secured to the first enclosure 1200 proximate to the lower boundary of path 1176 of the spiral guide 1170b. The attachment member 1114 includes the pin member 1114a, which is oriented to extend in a largely perpendicular direction from the surface of panel 1106a. The attachment member 1114, and its pin member 1114a, are arranged so as to engage the pivotable member 1144 and, specifically, to be received by and rest within the retention location 1618 of the pivotable member 1144 when the latch pin 1612 is engaged and retained by the actuator 1600. The retention location 1618 (relative to the pivot support 1146) is configured to induce a rotation of the pivotable member 1144 when the weight of the first enclosure 1200 is carried by the pivotable member 1144.

FIG. 11A illustrates the enclosure 101b in a suspended position (for example, as partially illustrated in FIG. 10B). In operation (and in the context of the illustrated embodiment) when a user issues a drop-signal via a user device 20, the control system 10 effects the opening of the lower jaw 1600b. With lower jaw 1600b open, the latch pin 1612 is free to leave the confines of the actuator 1600. The pivotable member 1144 then rotates about pivot support 1146. At a point in such rotation, the pin member 1114a is released from the retention location 1618 of the pivotable member 1144. When the pin member 1114a is released, the first enclosure 1200 is released from the suspended position. Accordingly, the first enclosure 1200 moves relative to the second enclosure 1250, wherein the spiral guides 1170 and rollers 1130 combine to effect a rotation of the first enclosure 1200 allowing the first enclosure 1200 to move from the suspended position to a lowered position. Conversely, to raise the first enclosure 1200 from the lowered position to a suspended position, a user first positions the pivotable member 1144 in an engaged position (FIG. 11A). The user pivots the pivotable member 1144 about the pivot support 1146 and locks the latch pin 1612 within the actuator 1600 (as described above). The user extends the line 1128 of the lifting mechanism 1125 so that clip 1129 may releasably engage suspension point 1105 (FIG. 9). The user then takes up line 1128 about the winch 1126. As the suspension point 1105 approaches the proximate support member 102, likewise the attachment member 1114 approaches the ramp surface 1616 of the pivotable member 1144. As the user continues to take up the line 1128, the pin member 1114A of the attachment member 1114 rides up the ramp surface 1616 until the pin member 1114A comes to rest in the retention location 1618 of the pivotable member. The user may then release the clip 1129 of the line 1128 from the suspension point 1105 and the first enclosure 1200 is in the suspended position and ready for actuation.

Another illustrated feature includes a safety device 1800, which is shown to be installed on the spiral guide 1170b. More specifically, the safety device 1800 includes a sleeve 1802a secured to the shown upper guide 1172 and a centerline-aligned sleeve 1802b secured to the shown lower guide 1174. The illustrated safety device 1800 further includes a removable retention pin 1804. The sleeves 1802a, 1802b operatively receive the retention pin 1804 to prevent inadvertent release of the first enclosure 1200. Operatively, when the first enclosure 1200 is a raised position, the retention pin 1804 is slid into the sleeves 1802a, 1802b so as to obstruct the path 1176 of the spiral guide 1170b, wherein if first enclosure 1200 were to initiate movement, the retention pin 1804 would operate to strike the frame 1602 and prevent further rotational movement. The illustrated safety device 1800 may also be positioned (or alternatively positioned) on spiral guide 1170a, as it is proximate to the user and the lifting mechanism 1125 during a raising exercise, wherein in such embodiment the placed retention pin 1804 would operate to strike the frame 1127 and prevent further rotational movement. It is noted that the illustrated safety device 1800 represents but one possible embodiment, where a simple pin-like element could be used to extend through an aperture passing through both the lower horizontal member 1108a of the first enclosure 1200 and, for example, an aligned aperture passing through (or at least partially through) a support member 1102 or the base member 1104.

FIG. 8 illustrates the assembly of the enclosure 101b and the relative interaction of the elements as described above. In general, assembly of the enclosure 101b may begin with the assembly of the second enclosure 1250, wherein each panel 1109b is secured to an adjoining panel 1109b via a linking support member 1120 or base member 1140. Then, each panel 1109a of the second enclosure 1250 is placed into an operable position, wherein the roller 1130 of each support member 1102 (or the base member 1104) is positioned within the path 1176 of the respective spiral guides 1170 of each panel 1109a. To aligned the first enclosure 1250 with the functional elements of the trap system 100, the roller 1130 of the base member 1104 should be received within the path 1176 of the spiral guide 1170b, and the roller 1130 of the support member 1102 proximate to the second receiver 1134 should be received within the path 1176 of the spiral guide 1170a. Each panel 1109a is then secured to each adjoining panel 1109a. The release mechanism 116b may then extend perpendicular to and through the path 1176 of the spiral guide 1170b and inserted into and secured within the first receiver 1132. The lifting mechanism 1125 may then extend perpendicular to and through the path 1176 of the spiral guide 1170a and inserted into and secured within the second receiver 1132. In a lowered position, a total height of the enclosure 101b is comprised of the combination of the first enclosure 1200 and the second enclosure 1250 (see FIG. 10A).

Figure 10D:
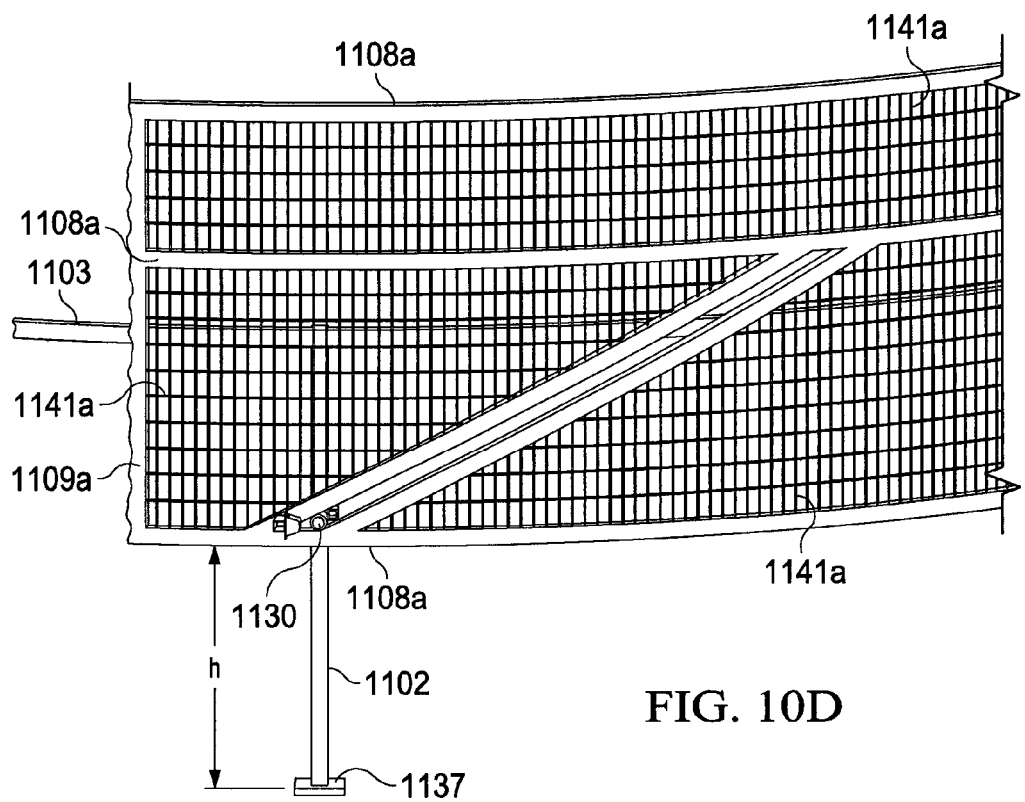
FIG. 10D is a cross-sectional side view of a single panel of the enclosure of FIG. 9, taken along the lines 10-10 of FIG. 9, in a suspended position, which shows an alternative configuration of the first and second enclosures of the system.

As another embodiment, as shown in part in FIG. 10D, the second enclosure 1250 may be so constructed as to provide a fixed, structural support for the first enclosure 1200 but includes no mesh 1141b, thus effectively offering no animal restraint features beyond that provided by the concentrically arranged first enclosure 1200 when operatively lowered. The support members 1102 and the base member 1104 may be coupled together by one or more cross-brace(s) 1103 and/or the horizontal members 1108b. In such embodiment, the second enclosure 1250 would provide, in and of itself, the total height of the enclosure 101b.

While the illustrated embodiment of enclosure 101b is circular, comprised of three panels 1106 and three corresponding rollers 1130, the enclosure 101b could assume a variety of alternative configurations. The enclosure 101b could comprise as few as two rollers 1130, as described above (or a mixture of rollers and other structural support elements), and as many as desired. The enclosure 101b could be comprised of one single panel 1106 or any plurality of panels 1106. There is no requirement that there exist a one-to-one correspondence among panels 1106a, spiral guides 1170 and rollers 1130, or that each panel must be configured the same. Lastly, the shape of the enclosure 101b, while shown as circular, could be constructed (particularly relative to the rollers 1130) in any shape so long as it rotated about centerline 1205 from a raised position to a lowered position to create an animal confinement about the trap area 107.

Figure 12A:
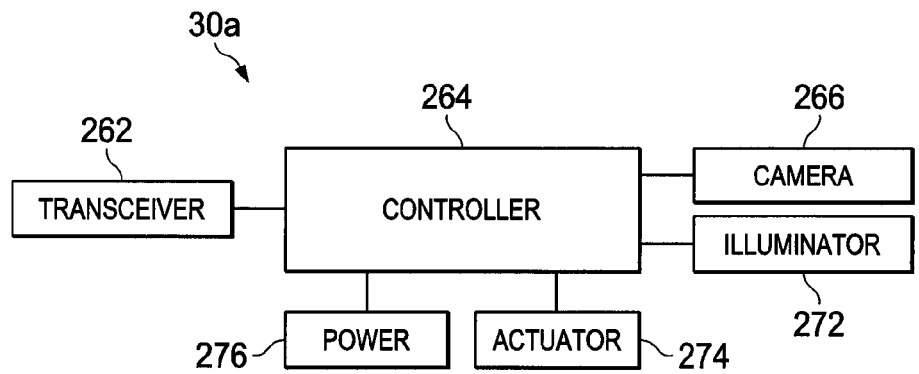
FIG. 12A is a block diagram showing an illustrative embodiment of a control system to operate the trap system of FIG. 2.

FIG. 12A shows an illustrative on-site system 30a of the control system 10, which is consistent with the illustration of FIG. 2. The on-site system 30a includes a power source 276 that supplies power to a controller 264 to coordinate the receipt and transmission of data, process such data and control equipment (e.g. illuminator 272, camera 266, actuator 124) proximate to the enclosure 101a, a camera 266, an illuminator 272 (e.g. infrared (IR) emitter, traditional light or other illumination device) and a transceiver 262 that transmits images to allow a user to view and monitor the trap area 107. The transceiver also enables a user to remotely effect the dropping of the enclosure 101 using a remote user device 20 such as a computer 20a, cellular device (e.g. smart phone) 20b or other electronic communications device.

The illustrated on-site system 30a of FIG. 12A includes a transceiver 262 to communicate with a remote user and may be, for example, a radio, a line-of-site transmitter, a cellular engine, a network card, Wi-Fi card or other wireless Internet-based device. The transceiver 262 is coupled to a controller 264, for example, a computer including an operating system such as Microsoft Windows or Linux, or a dedicated processor to collect, manage and transmit data. A power supply 276 supplies power to the on-site system 30a via the controller 264 or through a distribution network. The power supply 276 may be a battery, local AC source, a solar power system, a wind power system, a generator, or any other type of power system. The controller 264 is coupled to a camera 266 that monitors the trap area 107 and enclosure 101a. The controller 264 incorporates or is coupled to a multi-switch. The controller 264 is connected to and controls an illuminator 272, which may be an IR emitter. The illuminator 272 illuminates the trap area 107 and enclosure 101a. By remotely interfacing with the controller 264, a user may view images of the trap area 107 and enclosure 101a at any time of day or night from a remote site using the camera 266. The camera 266 may transmit images illuminated by daylight or infrared light from the illuminator 272. In one embodiment, the camera 266 may be a thermal camera. The controller 264 is also connected to an actuator 274, which is consistent with the actuator 124 (as described above). This configuration of the control system 10 allows the user to view and monitor the status of the trap area 107 and then send a drop signal to the controller 264 at the appropriate time, which causes the controller 264 to actuate the actuator 274. Actuating the actuator 274, in turn, effects the dropping of the enclosure 101a.

Figure 12B:
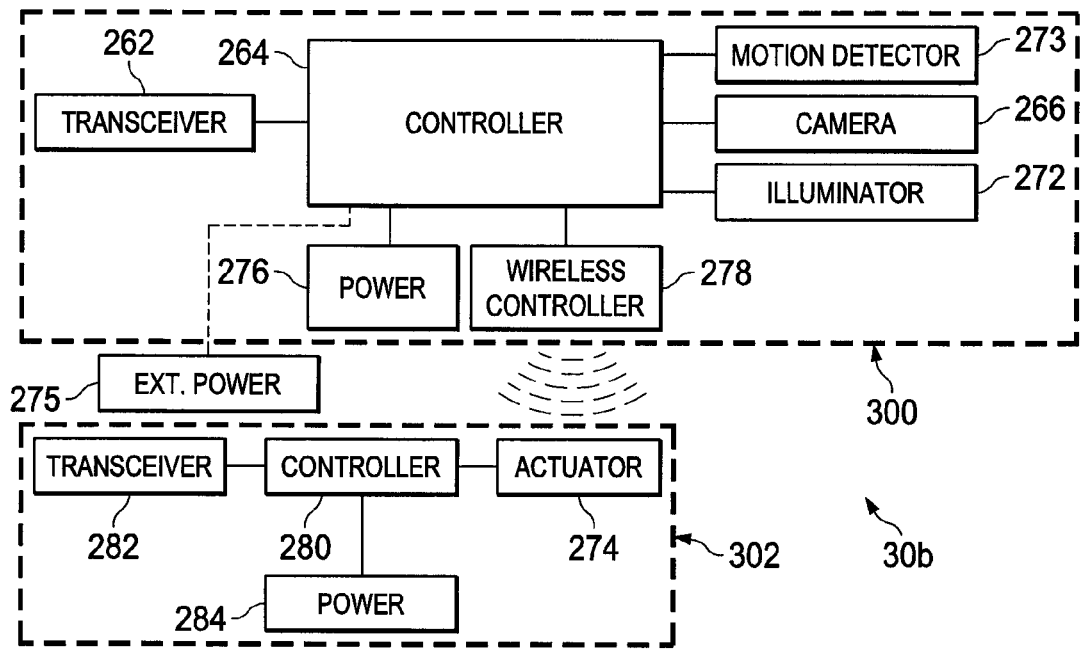
FIG. 12B is a block diagram showing an illustrative embodiment of a control system to operate the trap system of FIG. 1.

FIG. 12B shows another illustrative on-site system 30b of the control system 10, which is consistent with the illustration of FIG. 1. The on-site system 30b comprises a controller unit 300 and an enclosure control 302, which wirelessly communicate and are operatively coupled. As an integrated unit, the controller unit 300 incorporates two or more of the following elements: a power source 276, a controller 264 (as described above), an illuminator 272 (as described above), a passive motion detector 273, a camera 266 (as described above), a transceiver 262 (as described above), and a wireless controller 278 capable of issuing a wireless instructional signal to the controller unit 300 to one or more proximate, external devices. The controller unit 300 may be further coupled to an external power source 275, which may be a battery, local AC source, a solar power system, a wind power system, a generator, or any other type of power system. The controller unit 300 allows a user to view and monitor the trap area 107 and enables a user to remotely effect the dropping of the enclosure 101 using a remote user device 20 such as a computer 20a, telephone (e.g. smart phone) 20b or other electronic communications device. The enclosure control 302 is operatively coupled to controller unit 300 through a wireless connection. The enclosure control 302 includes a controller 280 to collect, manage and transmit data, which is operatively connected to a receiver/transceiver 282, a power supply 284 and an actuator 274 (as described above).

Consistent with the on-site system 30a, on-site system 30b—as part of the control system 10—allows the user to view and monitor the status of the trap area 107 and then send a drop signal to the controller 264 at the appropriate time, which causes the controller 264 to actuate the actuator 274. Actuating the actuator 274, in turn, effects the dropping of the enclosure 101a.

To monitor the enclosure 101, the user may access images transmitted by the controller 264 using, for example, an Internet communication protocol that allows the user to submit input to the controller 264 from a remote computer 20a or personal computing device 20b, such as a smart phone. In one embodiment, the user may view images, recorded video or real-time video taken by the camera 266 to determine whether animals are within the trap area 107. The controller 264 may also generate e-mail, SMS messages or, through a smartphone application, push notifications that are transmitted to the user to eliminate the need to constantly monitor the trap system 100; such notices may include still images of the trap area 107 to notify the user of specific activities within such trap area 107. With the use of still images, the user has the ability to activate the camera 266 and stream live video of the trap system 100, the user may quickly determine whether animals are within the trap area 107 and whether additional nearby animals, if any, are considering entering the trap area 107. The live video enables the user to wait until multiple animals have entered the trap area 107 before actuating the actuator 274 and dropping the enclosure 101. To actuate the actuator 274 and drop the enclosure 101, the user may enter a command via a remote computer 20a, cellular device (e.g. smart phone) 20b or other electronic communications device. The command, i.e. a drop signal, which is transmitted through the server 40 and IP network 50, is received at the controller 264 via the transceiver 262. In turn, the drop signal prompts the controller 264 to actuate the actuator 274 and drop the enclosure 101.

In an illustrative method for trapping wild animals based on trap system 100a of FIG. 2, panels 106 of a trap system 100a may be separately constructed and transported to a trap site. At the trap site, the base support 104 is located and installed at the trap area 107. Based on the size and configuration of the panels 106, the remaining support members 102 are installed at predetermined distances from the base support 104. The release mechanism 116 is installed to the base support 104 by, for example, bolting the release mechanism mount to the base support 104. As such, the release mechanism 116 and base support 104 may include complementary mounting features, such as slots, thru-holes, or other mounting features. When all of the panels 106 (1106) are in place, the ends of the panels 106 are coupled together to complete the enclosure 101a.

Continuing with the illustrative method, the cross-brace 103, as an optional element, may be coupled to span between 104 and an opposing support member 102 (or two opposing support members 102). The winch 128 may be mounted atop a support member 102 or to the cross-brace 103, and the winch cable 134 may then be coupled to one or more of the panels 106. The winch 128 may be used to raise the enclosure 101a to a height (h) and the cable 110 may be coupled to the release mechanism 116a, support member 102, and enclosure 101a. To ready the trap system 100a, the release mechanism 116a is releasably coupled to an actuator 124. Once readied, the trap system 100a may be remotely monitored and triggered by a user using a control system 10.

In another illustrative method for trapping wild animals based on the enclosure 101b of FIG. 8, the assembly and readying of the first enclosure 1200, the second enclosure 1250, lifting mechanism 1125 and release mechanism 116b are fully described above. Once readied, the trap system 100, incorporating at least the enclosure 101b, may be remotely monitored and triggered by a user using a control system 10.

Figure 13:
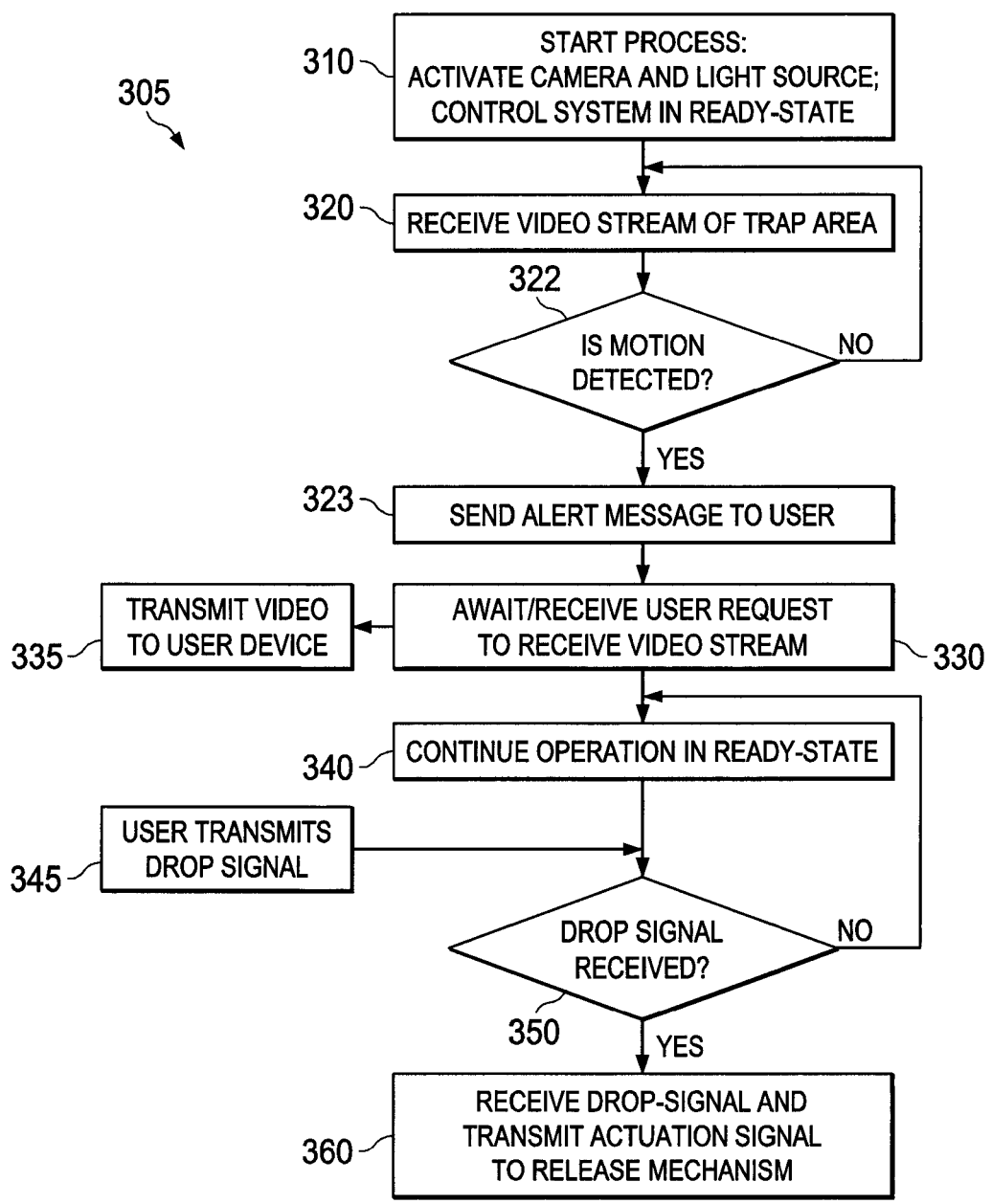
FIG. 13 is a flow chart showing a process for monitoring and actuating the system for trapping animals of FIG. 1.

To facilitate using the trap system 100, the control system 10 may execute one possible process 305 for monitoring and actuating the trap system 100, as illustrated in FIG. 13. In the process 305, the camera 266 and illuminator 272 of the on-site system 30 are activated to illuminate the trap area 107, and the controller 264 maintains a ready-state for transmitting an actuation signal to the actuator 274 (step 310). Once activated, the controller 264 receives a video stream of the trap area 107 from the camera 266 (step 320). The video stream, or an audio-video stream, may be monitored via transmission through an IP network 50 and server 40, to a remote computer 20a, a cellular device (e.g. smart phone) 20b or other electronic communications device of the user.

In this process embodiment, the controller 264 includes software that allows the controller 264 and camera 266 to function as a motion detector. In such an embodiment, the controller 264 determines whether motion is occurring in or near the trap area 107 (step 322). If motion is not detected, the control system 10 continues operation in a ready state. If motion is detected in or near the trap area 107, the controller 264 generates and transmits an alert message (step 323). The alert message may be an e-mail, SMS message or, through an smartphone application, push notifications (step 323) that are transmitted to a device of the user informing the user that motion has been detected at the trap area. Such message may include a picture or brief video of the trap area that enables the user to discern the source of the motion. In such an embodiment, the user is able to determine the source of the motion and whether such motion relates to a desired animal within the trap area 107 or whether another source of motion or type of animal has entered the trap area 107.

If the source of the motion is an animal that the user desires to trap, the user may log into the system to view a live video stream of the trap area 107. To receive the video stream, the user requests the video stream (step 330) from the controller 264 or server by, for example, logging into the server 40, and the video stream is transmitted to the device 20 of the user (step 335). The device 20 may be any type of personal computing device, including a computer 20a, cellular device 20b (e.g. smart phone) or other electronic communications device. While transmitting the video stream, the controller 264 maintains the trap system 100 in a ready-state (step 340) in which the controller 264 is ready to receive a drop-signal from the user. The drop-signal indicates a user request to actuate the trap system 100 and drop the enclosure 101 to trap any animals that might be within the trap area 107.

A user viewing the video stream may watch the video stream to determine when the desired number of animals, such as a sounder of feral hogs, has entered the trap area 107. Once the user determines that the desired number of animals have entered the trap area 107, the user transmits a drop-signal (step 345) to the controller 264. The controller 264 determines if a drop signal has been received (step 350). If the drop-signal has not been received, the trap system is maintained in the ready-state (step 340) awaits a drop-signal. If a drop signal has been received, the controller 264 transmits an actuation signal to the actuator 274, causing the enclosure 101 to drop and trap any animals in the trap area 107.

Figure 14:
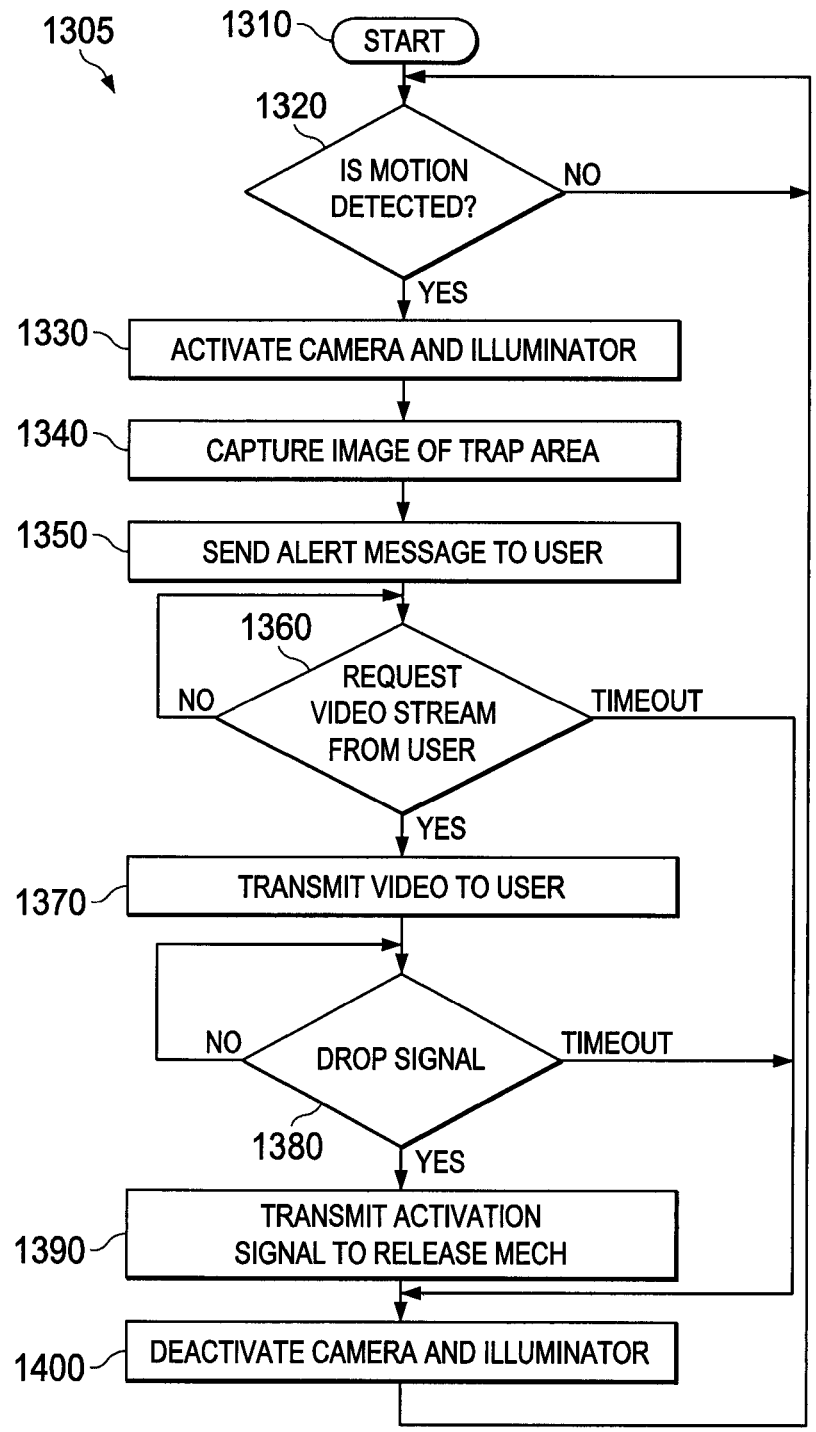
FIG. 14 is a flow chart showing an alternative process for monitoring and actuating the system for trapping animals of FIG. 1.

As an alternative process, to facilitate using the trap system 100, the control system 10 may execute another possible process 1305 for monitoring and actuating the trap system 100, as illustrated in FIG. 14. In the process 1305, the user activates the controller unit 300 of the on-site system 30, which enters a sleep state. In such sleep state, the controller unit 300 passively seeks to detect motion within or near the trap area 107 using the motion detector 273 (step 1320). In the absence of any such motion, the controller unit 300 remains in a sleep state. Upon detecting motion, the controller unit 300 enters an active state, and controller 264 activates camera 266 and illuminator 272 to illuminate the trap area 107. The controller 264 initiates an image capture of at least the trap area 107 (step 1340), wherein such image capture may include multiple images (e.g. video) or a single image. The controller 264 effects transmission of an alert message (step 1350), via transceiver 262, through the IP network 50 and server 40 to a user device 20, including a remote computer 20a, a cellular device (e.g. smart phone) 20b or other electronic communications device of the user. The alert message may take the form of an e-mail, SMS message or, through a smartphone application, push notifications that includes such earlier image capture of step 1340. Consistent with the other embodiments, the alert message enables the user to determine the source of the motion and whether such motion relates to a desired animal within the trap area 107 or whether another source of motion or type of animal has entered the trap area 107.

For a prescribed time, subject to control by the controller 264, the controller 264 will await a user request for live video (step 1360). If the user makes no such request during such prescribed time, the controller 264 will deactivate the camera 266 and illuminator 272 (step 1400) and the controller unit 300 will return to a sleep state. Alternatively, if within such prescribed time the user accesses the on-site system 30 via the user device 20 (and the server 40 and IP network 50), the controller 264 will effect the transmission of real-time video to the user device 20 (step 1370). While transmitting the video stream, the controller 264 maintains the trap system 100 in a ready-state in which the controller 264 is further ready to receive a drop-signal from the user.

A user viewing the video stream may watch the video stream to determine when a desired number of animals, such as a sounder of feral hogs, have entered the trap area 107. Once the user determines that the desired number of animals have entered the trap area 107, the user may transmit a user-issued drop-signal.

For a prescribed time, subject to control by the controller 264, the controller 264 will await such user-issued drop signal (step 1380). If the user makes no such request during such prescribed time, the controller will deactivate the camera 266 and illuminator 272 (step 1400) and the controller unit 300 will return to a sleep state. Alternatively, if within such prescribed time the user sends a drop-signal via the user device 20 (and the server 40 and IP network 50), the controller 264 will transmits an actuation signal to the actuator 274, causing the enclosure 101 to drop and trap any animals in the trap area 107. The controller 264 will then deactivate the camera 266 and illuminator 272 (step 1400) and the controller unit 300 will return to a sleep state.

While the previous embodiments describe "active" monitoring processes, it is preferred that the user further has the ability to access a video stream on command (whether or not motion has been detected, for example, step 322 or step 1320). In such instance, and in reference to the embodiment of FIG. 14, such user instruction would enter the illustrated process at step 1360, for example, wherein it would be necessary to first activate the camera 266 and illuminator 272 (similar to step 1330). The aforementioned and described steps would then enable the user to initiate and view live video. In such instance, the user can view and monitor the trap area 107 at will.

The controller unit 300 may include a sensor to detect ambient light conditions, which could restrict the operation of illuminator 272 to only those image capture events that require illumination.

It is noted that while trap systems 100a and 100b are described above as including a base support 104 and three support members 102 and a base support 1104 and two support members 1102, respectively, other embodiments may include a base support 104 any plurality of support members 102, including two, three, four, five, six, seven or eight support members 102 or 1102. Additionally, the enclosure 101 may be coupled to a base support 104 (or 1104) that is located in the center of an enclosure or offset at or about the perimeter of the enclosure 101a or 101b without the need for additional support members. In such an embodiment, the enclosure may have a robust, rigid structure and be coupled to the single base support 104 (or 1104) using one or more cables that are coupled to a release mechanism 116.

The steps of the methods described herein may be carried out in any suitable order, or simultaneously where appropriate. Where appropriate, aspects of any of the embodiments described above may be combined with aspects of any of the other embodiments described to form further examples having comparable or different properties and addressing the same or different problems.

While not critical to the operation of the trap system 100, it is understood that various accessories may be coupled to or attached to the trap system 100 to enhance its operability. For example, a waterer, feeder or other animal attractants may be attached to the second enclosure 1250, the support members 102 or 1102, the base members 104 or 1104, the cross-braces 103 or 1103, or other fixed structural elements of the enclosure 100. The described attachments could be manual in their operation, automatic and autonomous or controlled through the control system 10.

While the preferred embodiment of the trap system 100 is to enable and permit user control of the enclosure 101 for increased efficacy and safety via the monitoring of live video, in an alternative embodiment, the enclosure 101 could be configured to include an animal-triggered mechanism (not shown), which could include a trip wire or other mechanical device (e.g. operatively coupled to the release mechanism 116 to effect the release of the pivotable member 144 or 1144 upon contact or disturbance by an animal(s)). Alternatively, the animal-triggered mechanism could include an electronic sensor, for example, a close-range passive motion detector (e.g. operatively coupled to the enclosure control 302 to effect the release of the pivotable member 144 or 1144 upon a critical mass of motion within the enclosure 101)) to enable the automatic and autonomous operation of the trap system 101.

It will be understood that the above description of preferred embodiments is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the scope of the claims.

What is claimed is:

1. A system for trapping animals comprising:
   a support structure to rest on a surface;
   an enclosure rotationally coupled to the support structure to allow the enclosure to rotate about a centerline, relative to the support structure, to move between a suspended position and a lowered position, wherein the centerline is substantially perpendicular to the surface; and a release mechanism operably coupled to the enclosure and configured to hold the enclosure in the suspended position when the release mechanism is engaged and to release the enclosure to rotate relative to the support structure to transition to the lowered position when the release mechanism is released.

2. A system for trapping animals comprising:

a support structure to rest on a surface;

an enclosure rotationally coupled to the support structure to allow the enclosure to rotate about a centerline, relative to the support structure, to move between a suspended position and a lowered position, wherein the centerline is substantially perpendicular to the surface;

a release mechanism operably coupled to the enclosure and configured to hold the enclosure in the suspended position when the release mechanism is engaged and to release the enclosure to the lowered position when the release mechanism is released; and a control system, operably coupled to the release mechanism, to allow a remote user to release the release mechanism thereby allowing the enclosure to rotate relative to the support structure to drop the enclosure to the lowered position.

3. The system of claim 2, wherein the enclosure comprises one or more wire panel sections.

4. The system of claim 3, wherein the support structure comprises one or more wire panel sections.

5. The system of claim 2, further comprising a camera to allow the user to remotely view a trap area beneath the enclosure when the enclosure is in the suspended position.

6. The system of claim 2, wherein:
the support structure includes at least one support member; and
the enclosure includes at least one spiral guide that slideably engages the at least one support member to enable rotation relative to the support structure.

7. The system of claim 2, further comprising an actuator having an engaged position and a disengaged position, and the release mechanism comprises a pivotable member having a first portion that releasably engages the actuator and a second portion that releasably engages the enclosure, the pivotable member further being configured to rotate about a pivot support between an coupled position and a released position, wherein in the engaged position, the second portion of the pivotable member releasably engages and maintains the enclosure in the suspended position, and in the disengaged position, the second portion of the pivotable member in the released position releases the enclosure to rotate from the suspended position to the lowered position.

8. The system of claim 7, wherein the actuator in the engaged position releasably engages the first portion of the pivotable member in the coupled position, and the actuator in the disengaged position releases the first portion of the pivotable member to allow the pivotable member to rotate into the released position.

9. The system of claim 8, wherein the actuator is operably coupled to the control system, which controls whether the actuator is in the engaged position or the disengaged position; and the control system further comprises a communications system, to communicate with the user at remote locations, and a controller, coupled to and controlling at least the communications system and the actuator.

10. The system of claim 2 wherein the control system further comprises a camera to allow the user from a remote location to view at least a trap area beneath the enclosure in the suspended position.

11. The system of claim 10 wherein the control system further comprises:
a motion detector to detect motion at the trap area; and
a controller, coupled to the motion director and camera, to activate the camera upon detected motion by the motion detector and to notify the user through the control system.

12. The system of claim 11 wherein the control system further comprises a communications system, coupled to the controller, to communicate with the user at the remote location.

13. A system for trapping animals comprising:

a support structure to set on a surface;

an enclosure rotationally coupled to the support structure to allow the enclosure to rotate about a centerline, relative to the support structure, to move between a suspended position over a trap area and a lowered position encompassing the trap area, wherein the centerline is substantially perpendicular to the surface;

a release mechanism operably coupled to the enclosure and configured to hold the enclosure in the suspended position when the release mechanism is engaged and to release the enclosure to rotate relative to the support structure to transition to the lowered position when the release mechanism is released; and a camera to allow a user to remotely view the trap area beneath the enclosure when the enclosure is in the suspended position.

* * * * *